US012188228B2

(12) United States Patent
Bloomfield et al.

(10) Patent No.: US 12,188,228 B2
(45) Date of Patent: Jan. 7, 2025

(54) SCREEN AND FRAME FOR THE SAME

(71) Applicant: Herman Miller Limited, Melksham (GB)

(72) Inventors: Martin Bloomfield, Bathford (GB); Richard Coomber, Melksham (GB); Alexander Peter Martin, Bath (GB); Ralph Farrer, Somerset (GB)

(73) Assignee: Herman Miller Limited, Melksham (GB)

( * ) Notice: Subject to any disclaimer, the term of this patent is extended or adjusted under 35 U.S.C. 154(b) by 382 days.

(21) Appl. No.: 17/711,481

(22) Filed: Apr. 1, 2022

(65) Prior Publication Data

US 2023/0313526 A1 Oct. 5, 2023

(51) Int. Cl.
*E04B 2/74* (2006.01)
*A47B 83/00* (2006.01)
*E06B 3/968* (2006.01)
*E06B 3/98* (2006.01)

(52) U.S. Cl.
CPC .......... *E04B 2/7433* (2013.01); *A47B 83/001* (2013.01); *E06B 3/968* (2013.01); *E06B 3/982* (2013.01)

(58) Field of Classification Search
CPC ........ E04B 2/7433; E04B 2/7416; E04B 2/74; E04C 2/38; G09F 7/02; E06B 3/9644; E06B 3/982; E06B 3/968; A47B 83/001
USPC .......................................................... 160/351
See application file for complete search history.

(56) References Cited

U.S. PATENT DOCUMENTS 1,242,815 A * 10/1917 Kohler .................. E06B 3/9646 160/381
3,304,108 A * 2/1967 Hamiton ............... F16L 41/025 52/843
3,949,526 A * 4/1976 Sherlock ................. E06B 3/221 52/786.13
4,076,438 A * 2/1978 Bos ......................... E06B 3/982 403/402
4,570,406 A * 2/1986 DiFazio ................ E06B 3/9641 403/402

(Continued)

FOREIGN PATENT DOCUMENTS

EP 1092808 B1 6/2005
EP 1837476 A2 9/2007

(Continued)

*Primary Examiner* — Beth A Stephan
(74) *Attorney, Agent, or Firm* — Michael Best & Friedrich LLP

(57) ABSTRACT

A screen includes a frame and a panel coupled to the frame. The frame includes a first frame member having a first longitudinal axis, a first opening extending therethrough along the first longitudinal axis, and an aperture extending along an axis that intersects the first longitudinal axis, a second frame member having a second longitudinal axis and a second opening extending therethrough along the second longitudinal axis, and a connecting member coupled between the first frame member and the second frame member. The connecting member has a first portion that is received within the first opening and having a plate movable via a fastener to clamp the plate against the first frame member. The first fastener is accessible through the aperture. The connecting member also includes a second portion that is received in the second opening.

20 Claims, 21 Drawing Sheets

(56) References Cited

U.S. PATENT DOCUMENTS

| | | | | |
|---|---|---|---|---|
| 4,862,612 | A * | 9/1989 | Sugihara | A47G 1/101 403/402 |
| 5,378,077 | A * | 1/1995 | Paulsen | E06B 3/9682 403/402 |
| 5,431,211 | A * | 7/1995 | Guillemet | E06B 9/52 403/231 |
| 5,473,853 | A * | 12/1995 | Guillemet | E06B 9/52 160/381 |
| 5,477,628 | A * | 12/1995 | Chen | G09F 1/12 40/784 |
| 5,671,580 | A * | 9/1997 | Chou | E06B 3/968 403/402 |
| 6,108,997 | A * | 8/2000 | Blais | E06B 3/9645 52/656.1 |
| 6,161,320 | A * | 12/2000 | Peterson | G09F 15/0025 40/605 |
| 6,377,320 | B1 | 4/2002 | Ananian et al. | |
| 6,415,553 | B1 | 7/2002 | Krayer, Jr. et al. | |
| 6,672,365 | B2 * | 1/2004 | Therrien | E06B 9/52 160/381 |
| 6,681,833 | B2 | 1/2004 | Wylie | |
| 6,701,994 | B2 | 3/2004 | Goldenberg et al. | |
| 6,785,047 | B1 | 8/2004 | Risher | |
| 6,851,226 | B2 | 2/2005 | MacGregor et al. | |
| 6,886,300 | B2 * | 5/2005 | Hudoba | E06B 9/52 160/381 |
| 6,896,028 | B2 | 5/2005 | Brennan | |
| 7,210,513 | B2 | 5/2007 | Goldenberg et al. | |
| 7,313,880 | B2 | 1/2008 | Yamagishi | |
| 7,509,780 | B2 * | 3/2009 | Leontaridis | E06B 3/982 403/402 |
| 7,775,256 | B2 * | 8/2010 | Kim | E06B 3/9641 160/381 |
| 7,806,620 | B1 * | 10/2010 | Brochez | E06B 3/9765 403/403 |
| 7,826,134 | B2 | 11/2010 | Choi | |
| 8,490,347 | B2 | 7/2013 | Valler et al. | |
| 8,528,293 | B2 | 9/2013 | Sawyers et al. | |
| 8,572,925 | B2 | 11/2013 | Sawyers et al. | |
| 8,636,437 | B2 | 1/2014 | Therrien | |
| 8,763,342 | B2 * | 7/2014 | Tseng | E06B 3/9644 403/402 |
| 8,840,333 | B2 | 9/2014 | Massey | |
| 8,851,787 | B2 * | 10/2014 | Kelley | B29C 66/72523 403/402 |
| 9,255,440 | B2 | 2/2016 | Alexander et al. | |
| 9,345,357 | B1 | 5/2016 | Davila, Jr. | |
| 9,528,315 | B2 * | 12/2016 | Kim | E06B 3/9765 |
| 9,611,688 | B1 * | 4/2017 | Vanderbent, Jr. | E06B 3/5063 |
| 9,617,784 | B2 | 4/2017 | Houlihan | |
| 9,631,417 | B2 | 4/2017 | Massey | |
| 9,869,122 | B2 | 1/2018 | Isaacs et al. | |
| 10,094,164 | B2 * | 10/2018 | Massey | E06B 3/9642 |
| 10,174,544 | B2 * | 1/2019 | Kellum | E06B 3/9646 |
| 10,189,299 | B2 | 1/2019 | Spiro et al. | |
| 10,294,659 | B1 | 5/2019 | Lin | |
| 10,538,913 | B2 | 1/2020 | Matthai et al. | |
| 10,619,405 | B2 * | 4/2020 | Leontaridis | E06B 3/982 |
| 10,837,226 | B2 * | 11/2020 | Jeffries | E06B 3/9624 |
| 11,191,372 | B2 * | 12/2021 | Chen | G03B 21/60 |
| 11,268,318 | B2 * | 3/2022 | Dong | E06B 3/982 |
| 2004/0035082 | A1 * | 2/2004 | Hudoba | E06B 9/02 52/656.9 |
| 2004/0244924 | A1 | 12/2004 | Peppett | |
| 2005/0193680 | A1 * | 9/2005 | Wang | E06B 3/9688 52/656.9 |
| 2006/0157208 | A1 | 7/2006 | Annacchino | |
| 2006/0233600 | A1 | 10/2006 | Egli et al. | |
| 2007/0113497 | A1 | 5/2007 | Carless | |
| 2007/0297854 | A1 * | 12/2007 | Ohrstrom | E05D 15/0682 403/401 |
| 2008/0131197 | A1 | 6/2008 | Hamlen | |
| 2008/0159806 | A1 | 7/2008 | Niswonger | |
| 2010/0043268 | A1 * | 2/2010 | Powell | A47G 1/10 40/785 |
| 2011/0194886 | A1 * | 8/2011 | Wu | E06B 3/9641 403/23 |
| 2011/0258897 | A1 * | 10/2011 | Dorsey | A47G 1/101 29/428 |
| 2012/0305203 | A1 | 12/2012 | Verbeek et al. | |
| 2014/0311036 | A1 | 10/2014 | Alexander et al. | |
| 2014/0360124 | A1 * | 12/2014 | Kim | E06B 1/36 52/656.9 |
| 2016/0143462 | A1 * | 5/2016 | Pirayesh | A47G 1/102 403/295 |
| 2016/0265268 | A1 | 9/2016 | Therrien | |
| 2019/0242182 | A1 | 8/2019 | Newhouse et al. | |
| 2020/0032578 | A1 * | 1/2020 | Parry | E06B 3/9645 |
| 2020/0064724 | A1 | 2/2020 | Risher | |
| 2020/0236790 | A1 | 7/2020 | Kasuya | |
| 2022/0049542 | A1 * | 2/2022 | Wagemans | E06B 3/968 |

FOREIGN PATENT DOCUMENTS

| | | | |
|---|---|---|---|
| EP | 2971396 | B1 | 10/2017 |
| EP | 2875507 | B1 | 8/2018 |
| WO | WO2009052656 | A1 | 4/2009 |
| WO | WO2013109788 | A1 | 7/2013 |
| WO | WO2020122871 | A1 | 6/2020 |

* cited by examiner

SCREEN AND FRAME FOR THE SAME

FIELD OF THE INVENTION

The present invention relates to screens, and more specifically to frames for screens.

BACKGROUND OF THE INVENTION

Screens are often supported with support surfaces, such as a desk or floor, and may be used to create private spaces. Some screens include stiffening elements, such as brackets, rods, and/or frames to help the screens retain their shape and/or connect to other structures.

SUMMARY OF THE INVENTION

The present invention provides, in one aspect, a screen includes a frame and a panel coupled to the frame. The frame includes a first frame member having a first longitudinal axis, a first opening extending therethrough along the first longitudinal axis, and an aperture extending along an axis that intersects the first longitudinal axis, a second frame member having a second longitudinal axis and a second opening extending therethrough along the second longitudinal axis, and a connecting member coupled between the first frame member and the second frame member. The connecting member has a first portion that is received within the first opening and having a plate movable via a fastener to clamp the plate against the first frame member. The first fastener is accessible through the aperture. The connecting member also includes a second portion that is received in the second opening.

The present invention provides, in another aspect, a screen includes a frame and a panel coupled to the frame. The frame includes a plurality of frame members, each of the plurality of frame members including a longitudinal axis, an opening extending therethrough along the longitudinal axis, and an aperture extending along an axis that intersects the longitudinal axis. The frame also includes a plurality of connecting members, each of the plurality of connecting members including a first portion that is received within the opening of one frame member of the plurality of frame members. The first portion includes a first expansion joint that has a first plate and a first fastener accessible through the aperture in the one frame member such that the first fastener is actuatable to clamp the first plate against the one frame member. The connecting member also includes a second portion that is received within the opening of an adjacent frame member of the plurality of frame members. The second portion includes a second expansion joint that has a second plate and a second fastener accessible through the aperture of the adjacent frame member such that the second fastener is actuatable to clamp the second plate against the adjacent frame member.

The present invention provides, in another aspect, a method of assembling a screen including assembling a frame and coupling a panel to the frame. Assembling a frame includes positioning a first portion of a connecting member within a first opening of a first frame member. The first portion includes a first plate and a first fastener. Assembling a frame also includes positioning a second portion of the connecting member within a second opening of a second frame member. The second portion includes a second plate and a second fastener. Also, assembling a frame includes clamping the first plate of the connecting member to the first member by actuating the first fastener, where the first fastener is accessible from outside of the first frame member, and clamping the second plate of the connecting member to the second member by actuating the second fastener, where the second fastener is accessible from outside of the second frame member.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
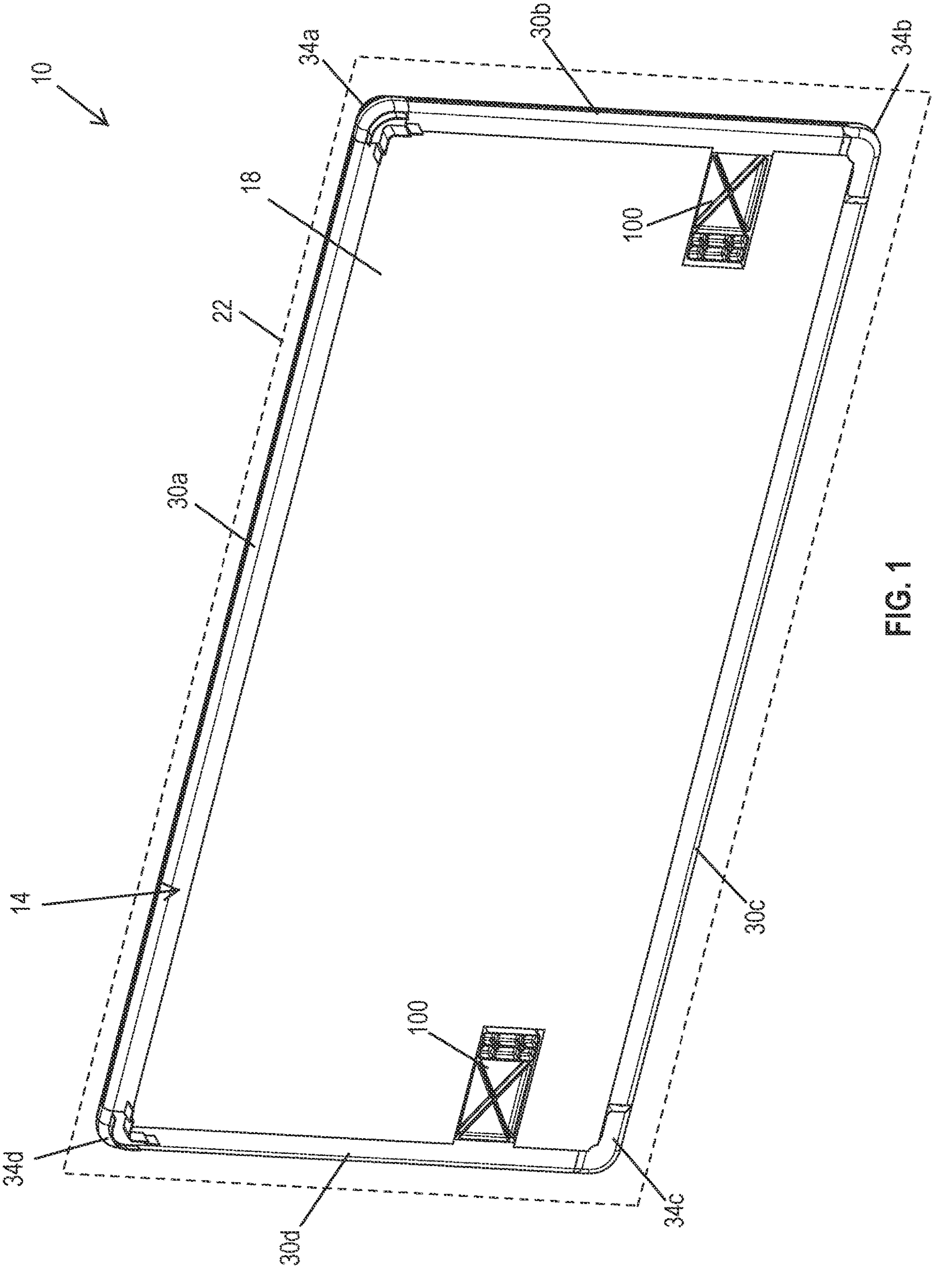
FIG. 1 is a perspective view of a screen according to one embodiment, the screen having a frame and a panel, the frame including frame members and connecting members.

FIGS. 1-12 illustrates a screen 10 according to one embodiment of the invention. As shown in FIG. 1, the screen 10 includes a frame 14, a panel 18 coupled to the frame 14, and a cover 22 enclosing the frame 14 and the panel 18.

Figure 2:
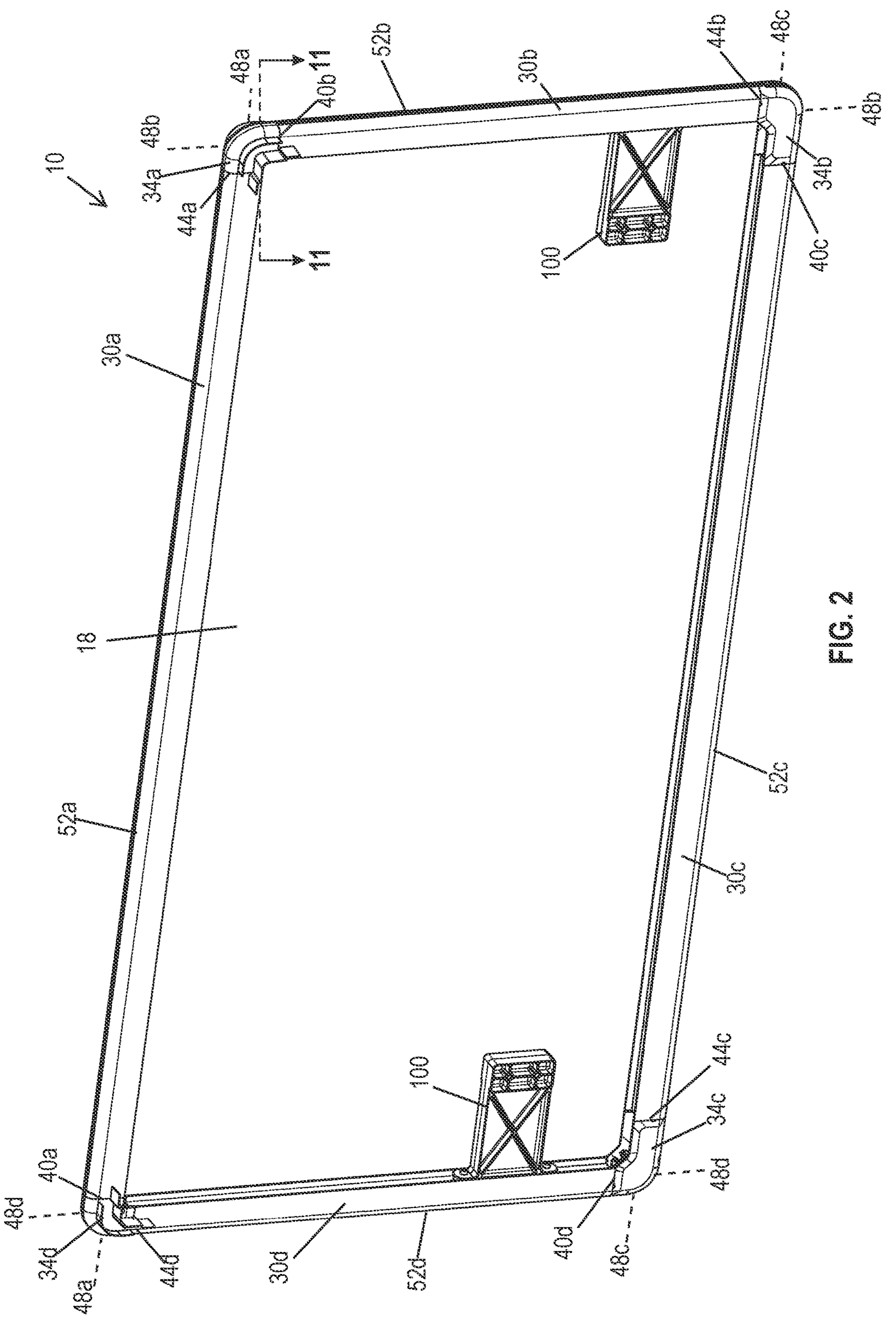
FIG. 2 is a perspective view of the screen of FIG. 1 with the panel removed.
Figure 3:
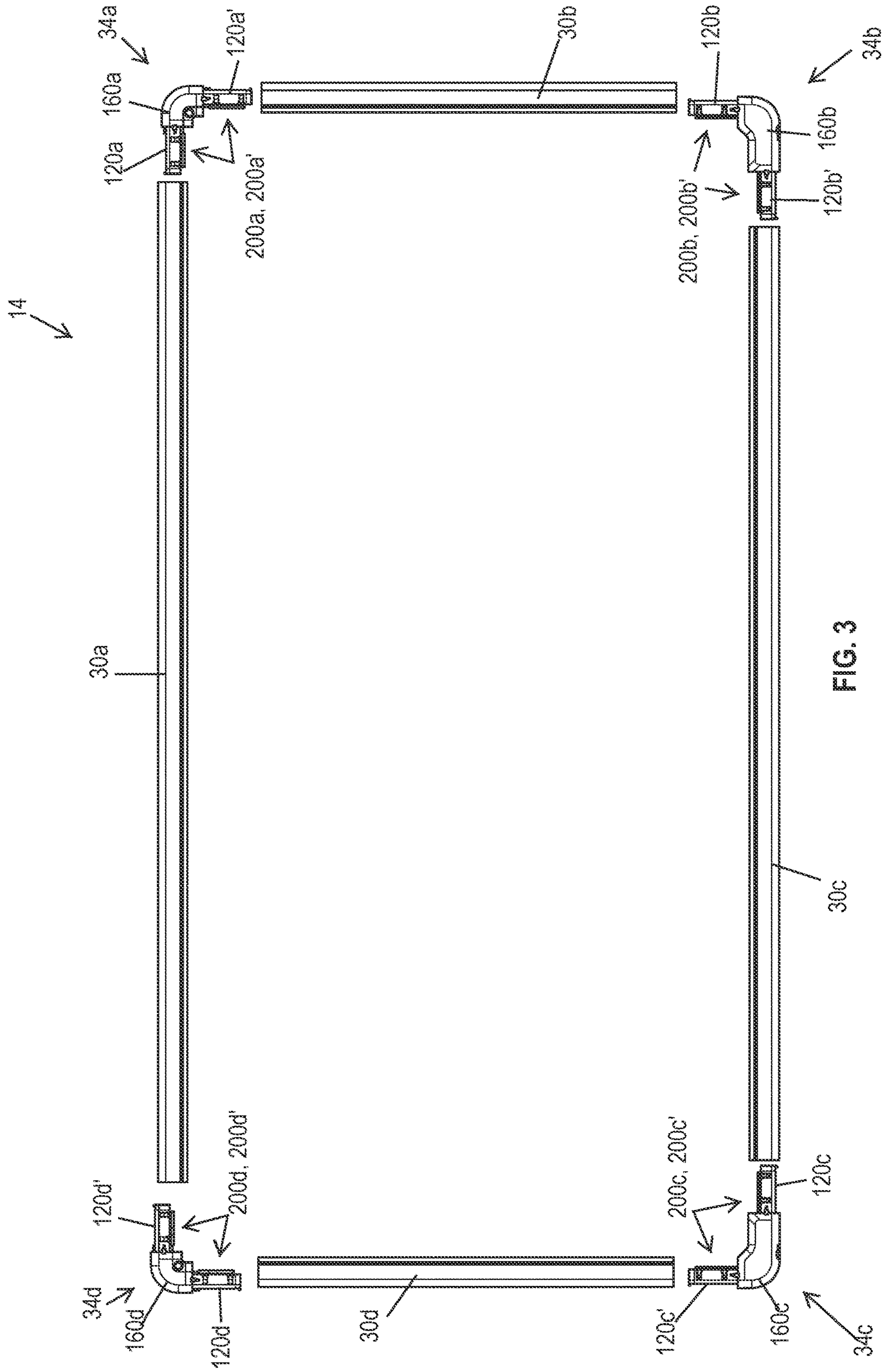
FIG. 3 is a front exploded view of the frame of FIG. 1.

With respect to FIGS. 1-3, the frame 14 includes a plurality of frame members 30*a*-30*d* and a plurality of connecting members 34*a*-34*d* that couple the plurality of frame members 30*a*-30*d* to one another. In the illustrated embodiment, the plurality of frame members 30*a*-30*d* includes a first frame member 30*a*, a second frame member 30*b*, a third frame member 30*c*, and a fourth frame member 30*d*. Similarly, the plurality of connecting members 34*a*-34*d* includes a first connecting member 34*a*, a second connecting member 34*b*, a third connecting member 34*c*, and a fourth connecting member 34*d*. The first connecting member 34*a* couples the first frame member 30*a* to the second frame member 30*b*. The second connecting member 34*b* couples the second frame member 30*b* to the third frame member 30*c*. The third connecting member 34*c* couples the third frame member 30*c* to the fourth frame member 30*d*. The fourth connecting member 34*d* couples the fourth frame member 30*c* to the first frame member 30*d*. Using these components, the illustrated frame 14 (and thereby the screen 10) has a generally rectangular or square shape. In other embodiments, the frame 14 may have other frame members to achiever other shapes (e.g., trapezoidal, triangular, rounded, etc.).

Figure 4:
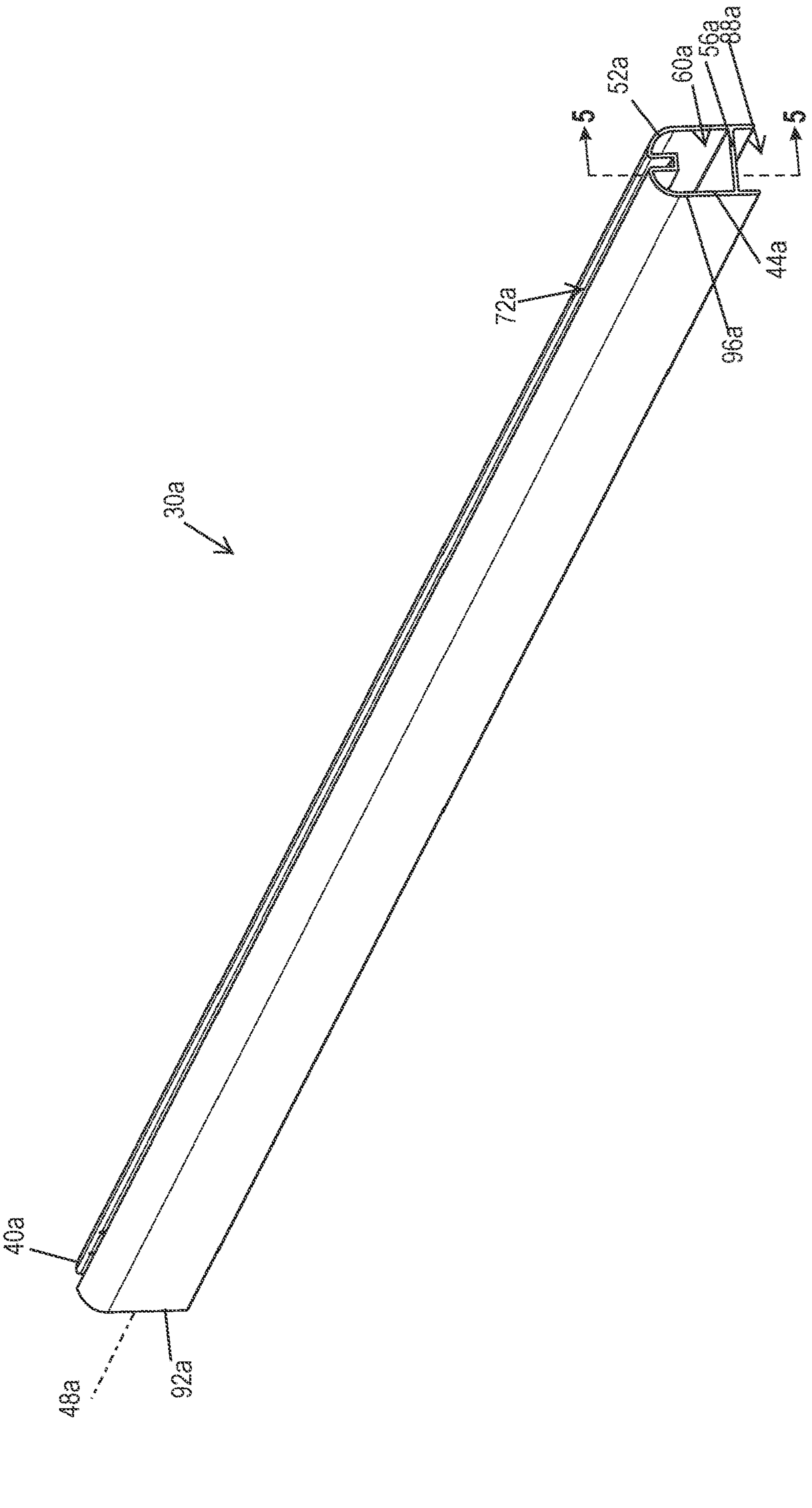
FIG. 4 is a perspective view of a first frame member of FIG. 1.
Figure 5:
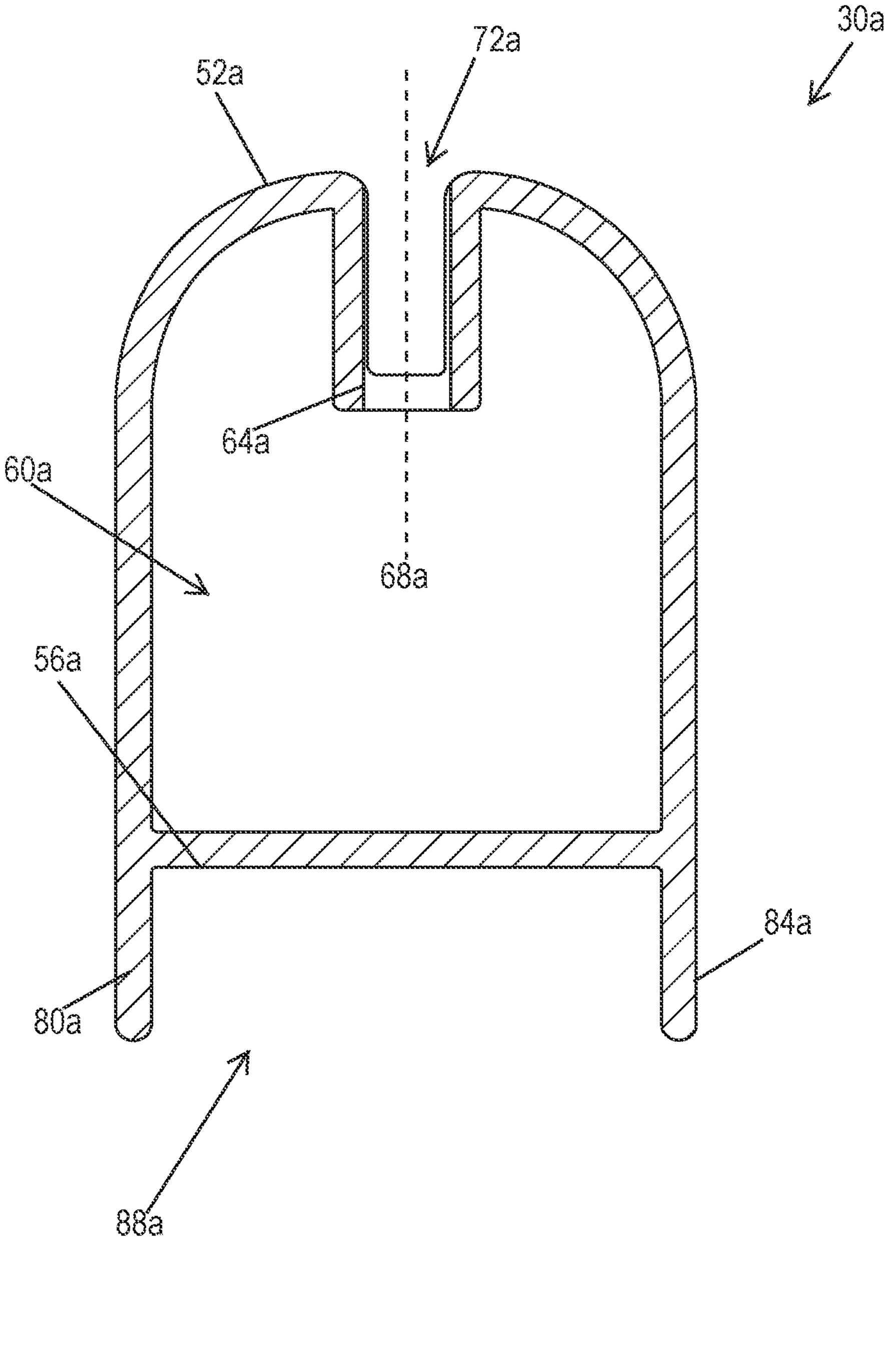
FIG. 5 is a cross-sectional view of the first frame member of FIG. 1 taken along the line 5-5 of FIG. 4.

Although only the first frame member 30*a* is shown in detail in FIGS. 4 and 5, the following description applies to each of the plurality of frame members 30*a*-30*d*. The first frame member 30*a* includes a first end 40*a*, a second end 44*a* opposite the first end 40*a*, a longitudinal axis 48*a* extending from the first end 40*a* to the second end 44*a*, a first side 52*a* (e.g., an outer side), and a second side 56*a* (e.g., an inner side). The second, third and fourth frame members 30*b*-30*d* each include first ends 40*b-d* and opposite second ends 44*b-d*, a longitudinal axis 48*b-d*, and a first side 52*b-d*, respectively. As shown, an opening 60*a* extends from the first end 40*a* to the second end 44*a* along the first longitudinal axis 48*a*. Also, with respect to FIG. 5, an aperture 64*a* extends along an axis 68*a* that intersects the longitudinal axis 48*a*, which is into the page in FIG. 5.

In the illustrated embodiment, the first frame member 30*a* is substantially hollow and therefore the opening 60*a* extends along the entire length of the first frame member 30*a*. Moreover, the first frame member 30*a* includes a groove 72*a* that extends into the opening parallel to the longitudinal axis 48*a*. The groove 72*a* is positioned on the first side 52*a* of the first frame member 30*a*, and the aperture 64*a* extends through a surface of the groove 72*a* such that the aperture 64*a* is recessed relative to the first side 52*a* of the first frame member 30*a*. In the illustrated embodiment, the aperture 64*a* is one of a plurality of apertures 64*a*. Two of the plurality of apertures 64*a* are positioned adjacent to the first end 40*a* of the first frame member 30*a*, and two of the plurality of apertures 64*a* are positioned adjacent to the second end 44*a* of the first frame member 30*a*. In the illustrated embodiment, the axis 68*a* of each of the apertures 64*a* is parallel to the other axes 68*a* and is perpendicular to the longitudinal axis 48*a* in the illustrated embodiment.

The first frame member 30*a* also includes a first flange 80*a* coupled to and extending from the second side 56*a* and a second flange 84*a* coupled to and extending from the second side 56*a*. The first flange 80*a* and the second flange 84*a* extend along the length of the first frame member 30*a*. The first flange 80*a* and the second flange 84*a* are spaced apart from one another, and a define a channel 88*a* therebetween. The channel 88*a* is configured to receive and secure one side of the panel 18. In the illustrated embodiment, the first side 52*a* has a substantially arcuate surface. Also, the first end 40*a* has a first surface 92*a* and the second end 44*a* has a second surface 96*a*. Each of the first surface 92*a* and the second surface 96*a* are substantially flat or planar.

In other embodiments, the first frame member 30*a* may have other configurations. For example, one opening 60*a* may extend from the first end 40*a* partially through the first frame member 30*a* and one opening 60*a* may extend from the second end 44*a* partially through the first frame member 30*a*. In such case, the first frame member 30*a* may include a groove 72*a* that extends into each of the openings 60*a* and that extends parallel the longitudinal axis 48*a*.

Regardless of the configuration, the first frame member 30*a* is formed as a single unitary piece from a first material. In the illustrated embodiment, the first material is a metal, such as aluminum. In other embodiments, the first frame member 30*a* may be made of other materials.

In some embodiments, such as that shown in FIGS. 1-12, one or more of the plurality of frame members 30*a*-30*d* may include one or more support members 100, which are configured to support the screen 10 relative to a support surface, such as a desktop or the floor. The support members 100 will be discussed in greater detail below.

Figure 8:
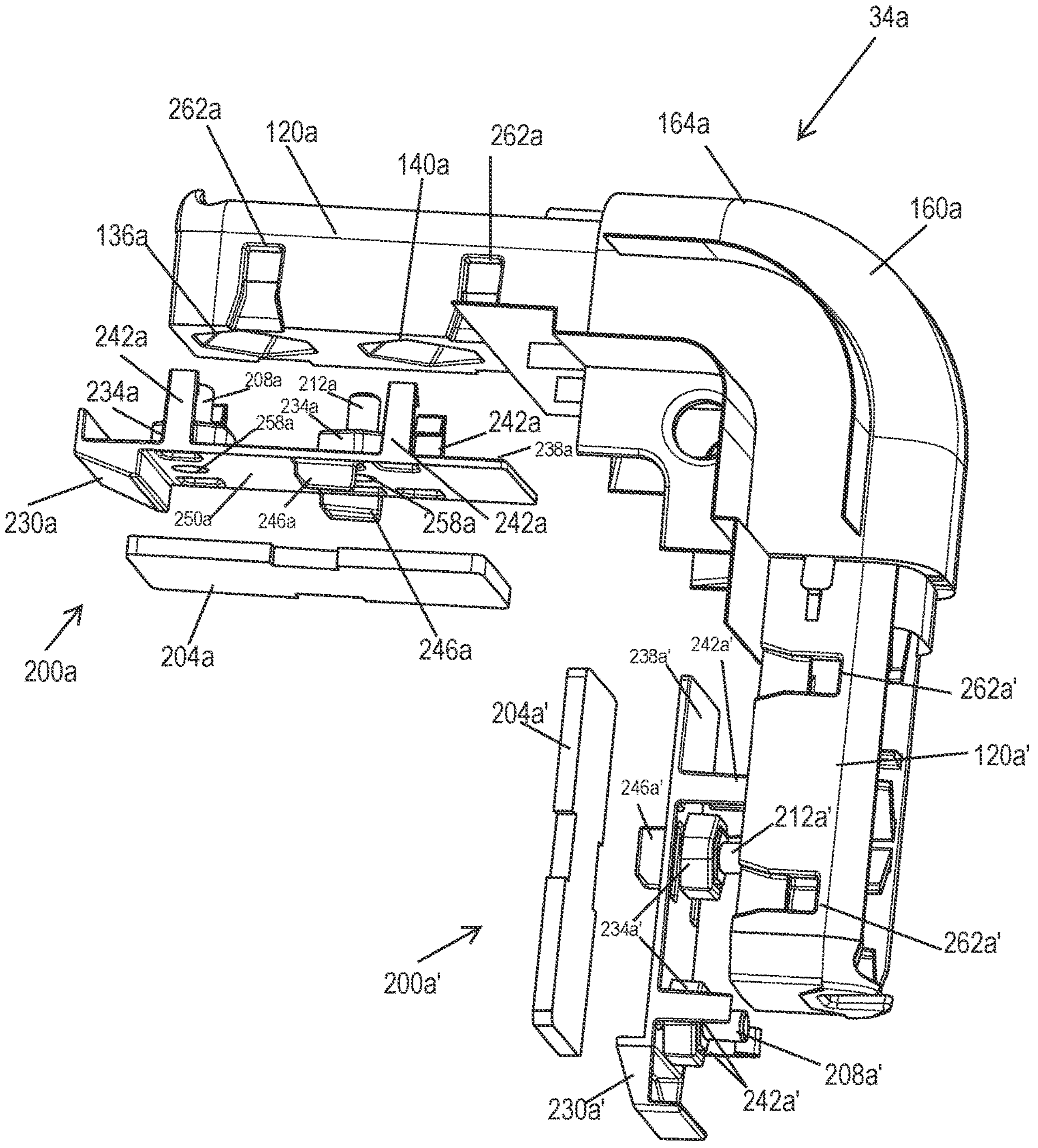
FIG. 8 is an exploded view of the connecting member of FIG. 1.
Figure 9:
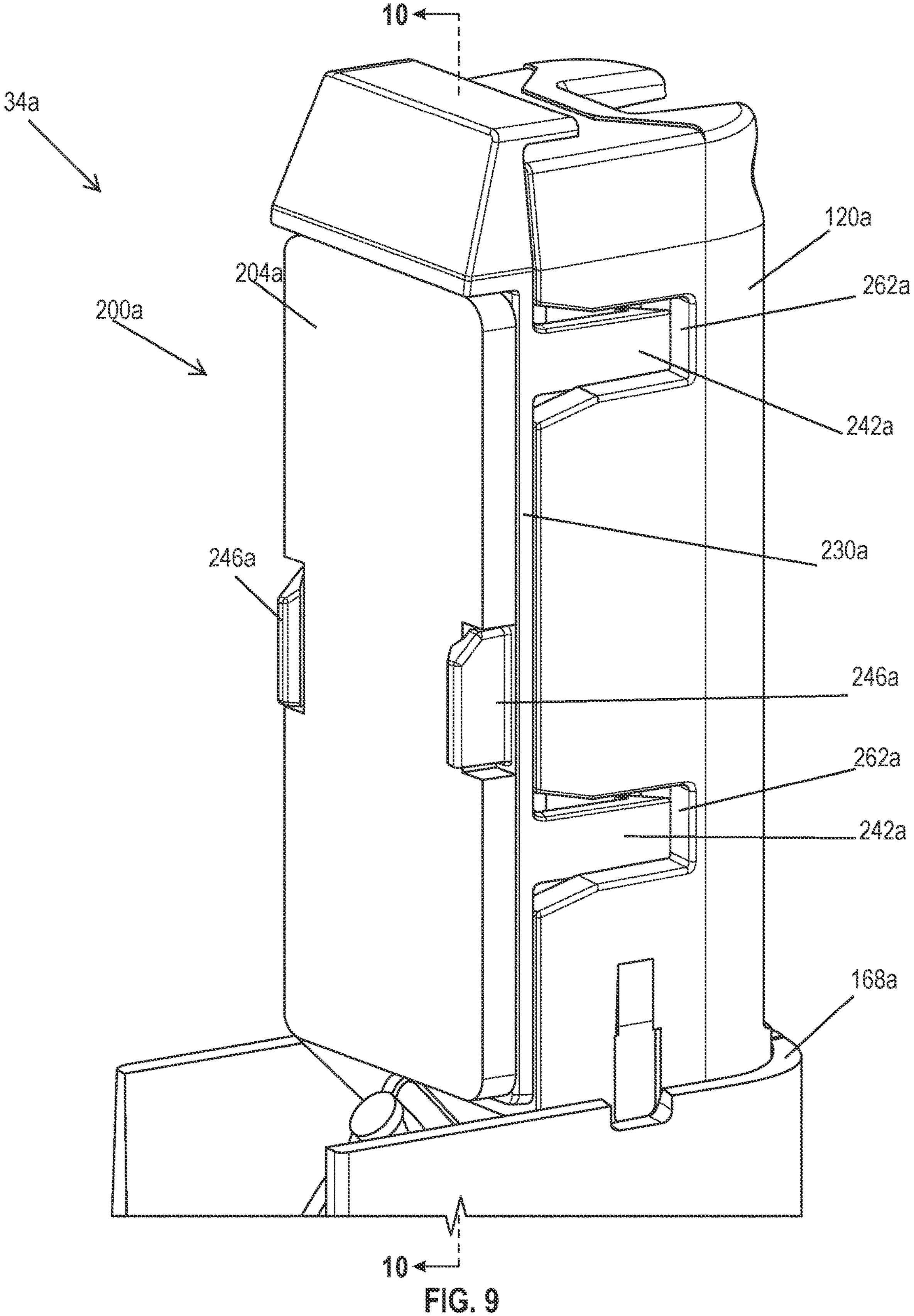
FIG. 9 is a detailed perspective view of the connecting member of FIG. 1.
Figure 10:
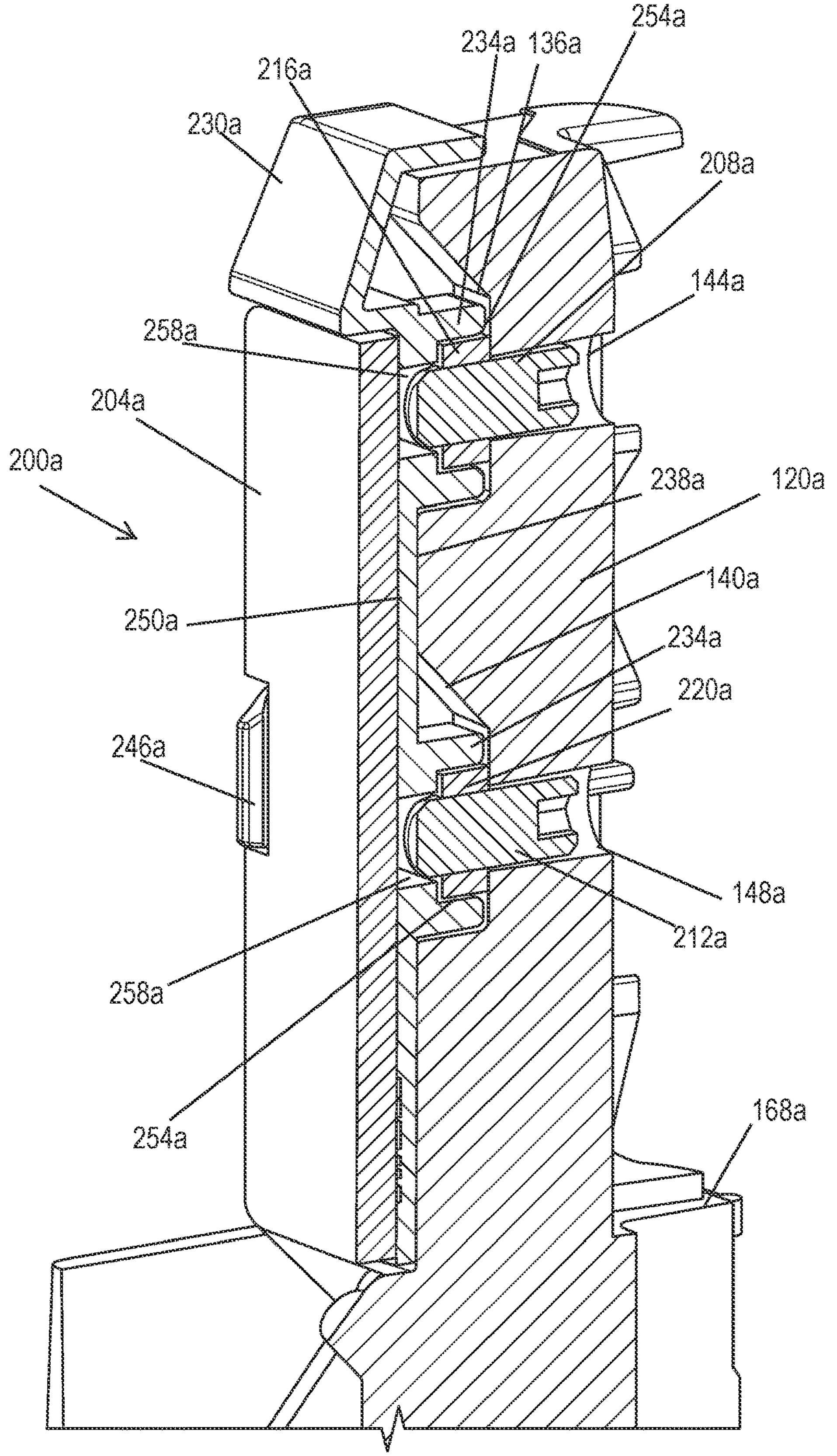
FIG. 10 is a cross-sectional view of the connecting member taken along the line 10-10 of FIG. 9.

The first connecting member 34*a* is shown in FIGS. 7A-11. The following discussion of the first connecting member 34*a* applies equally to the second, third, and fourth connecting members 34*b*-34*d*. The first connecting member 34*a* includes a body that has a first portion 120*a* and a second portion 120*a*'. The first portion 120*a* extends along a first axis 128*a*, and the second portion 120*a*' extends along a second axis 128*a*' that intersects the first axis 128*a*. In the illustrated embodiment, the first axis 128*a* and the second axis 128*a*' intersect at a non-parallel angle. For example, in the illustrated embodiment, the first axis 128*a* and the second axis 128*a*' are oriented at a substantially ninety-degree angle (e.g., the axes 128*a*, 128*a*' are perpendicular to one another), but in other embodiments, the angle may be greater or less than ninety degrees. Additionally, in some embodiments, the angle may be parallel such that the axes 128*a*, 128*a*' are coincident with one another. In the illustrated embodiment, each of the first and second portions 120*a*, 120*a*' includes a first recess 136*a*, 136*a*' and a second recess 140*a*, 140*a*'. Although only the recesses 136*a*, 140*a* of the first portion 120*a* are shown in FIG. 8 and FIG. 10, the recesses 136*a*', 140*a*' of the second portion 120*a*' have the same structure and orientation. Each of the first and second recesses 136*a*, 136*a*', 140*a*, 140*a*' define an aperture 144*a*, 148*a*, 144*a*', 148*a*' extending therethrough.

In the illustrated embodiment, the first connecting member 34*a*, like each of the plurality of connecting members 34*a*-34*d*, are corner members and therefore a corner portion 160*a* extends between the first portion 120*a* and the second portion 120*a*'. As shown, the first portion 120*a* extends from the corner portion 160*a* and the second portion 120*a*' extends from the corner portion 160*a*. The corner portion 160*a* has an arcuate outer surface 164*a* and a first surface 168*a* and a second surface 172*a*. Each of the first surface 168*a* and the second surface 172*a* are substantially flat or planar. In some embodiments, not shown in FIGS. 7A-11, the arcuate outer surface may define a groove (see the second connecting member 34*b* and groove 166*b*).

The first portion 120*a* includes a first expansion joint 200*a* and the second portion 120*a*' includes a second expansion joint 200*a*'. The first and second expansion joints 200*a*, 200*a*' have the same structure. Although the following discussion of the expansion joints 200*a*, 200*a*' refers to the first expansion joints 200*a*, it applies equally to the second expansion joint 200*a'*.

The first expansion joint 200*a* includes a plate 204*a*, a first fastener 208*a* (e.g., a set screw), and a second fastener 212*a* (e.g., a set screw). In the illustrated embodiment, the first fastener 208*a* is threadably coupled to a first nut 216*a*, which is positioned in the first recess 136*a* of the first portion 120*a*. Similarly, the second fastener 212*a* is threadably coupled to a second nut 220*a*, which positioned in the second recess 140*a* of the first portion 120*a*. In the illustrated embodiment, the expansion joints 200*a* includes two fasteners but in other embodiments, the expansion joints 200*a* may include a single fastener or more than two fasteners.

Figure 11:
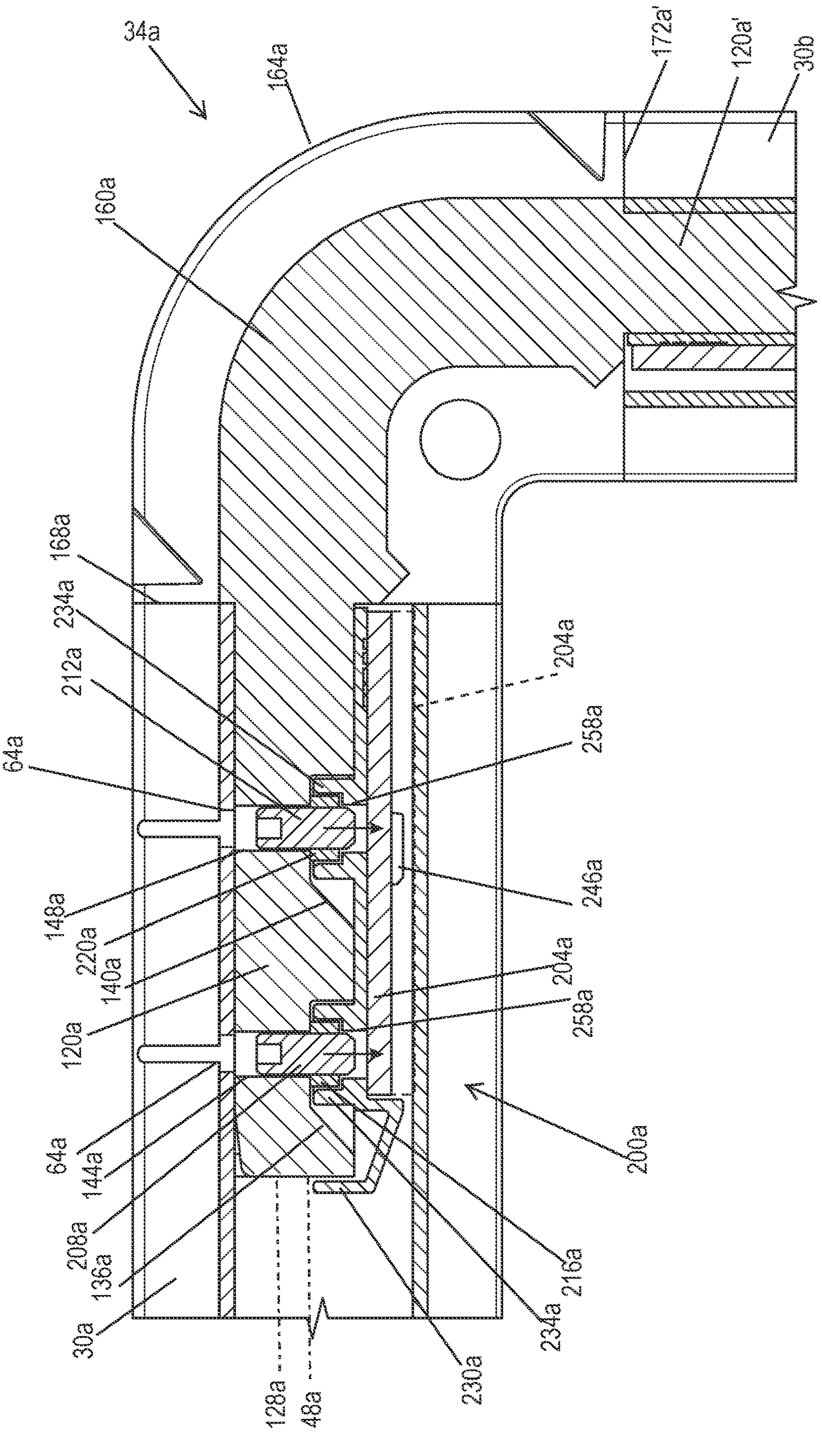
FIG. 11 is a cross-sectional view of the connecting member taken along the line 11-11 of FIG. 2.

The first fastener 208*a* and the second fastener 212*a* are movable (e.g., rotatable) to move the plate 204*a* relative to the first portion 120*a* of the connecting member 34*a*. That is, as shown, the first fastener 208*a* and the second fastener 212*a* move the plate 204*a* from a retracted position (FIG. 11) to an extended position (FIG. 11).

In the illustrated embodiment, a retainer 230*a* is positioned between the first portion 120*a* and the plate 204*a*. The retainer 230*a* includes a body that has first projections 234*a* extending from opposite sides of a first surface 238*a*, second projections 242*a* that extend from the first surface 238*a*, and third projections 246*a* extending from opposite sides of a second surface 250*a*. Each of the first projections 234*a* defines a recess 254*a*. An aperture 258*a* extends through each of the recesses 254*a* from the first surface 238*a* to the second surface 250*a*. One of the first projections 234*a* is received in the first recess 136*a* in the first portion 124*a* such that the aperture 258*a* of the retainer 230*a* is aligned with the corresponding aperture 144*a* of the first portion 120*a*. The first nut 216*a* is positioned within the recess 254*a* of the projection 234*a* and the first fastener 208*a* is movable to extend through the corresponding aperture 258*a* in the retainer 230*a*. The other of the first projections 234*a* is received in the second recess 140*a* in the first portion 120*a* such that the aperture 258*a* of the retainer 230*a* is aligned with the corresponding aperture 148*a* of the first portion 120*a*. The second nut 220*a* is positioned within the recess 254*a* of the projection 234*a* and the second fastener 212*a* is movable to extend through the corresponding aperture 258*a* in the retainer 230*a*. The second projections 242*a* each have a hook that retains the retainer 230*a* relative to the first portion 120*a*. As shown, the hook is received in and retained in a snap-fit engagement with a corresponding opening 262*a* in the first portion 120. The third projections 246*a* each have a hook that temporarily retains the plate 204*a* relative to the retainer 230*a*, as will be discussed in greater detail below.

Figure 12:
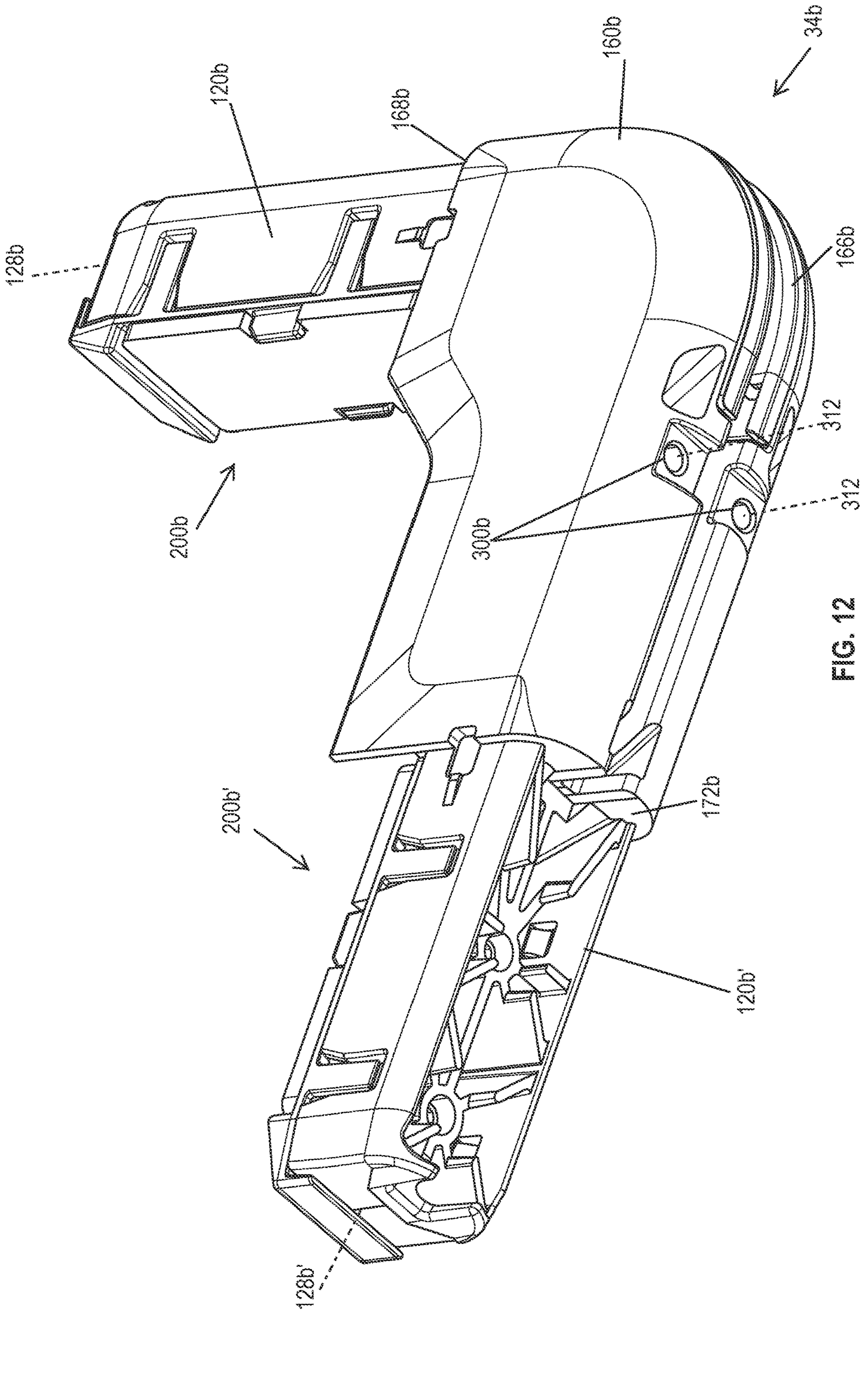
FIG. 12 is a perspective view of another connecting member of FIG. 1.

The second connecting member 34*b* is shown in FIG. 12. As shown in FIG. 12, and as noted above, the second connecting member 34*b* has a slightly different structure, but still includes a first portion 120*b*, a second portion 120*b*', a corner portion 160*b*, a first expansion joint 200*b*, and a second expansion joint 200*b*'. The first portion 120*b* and the second portion 120*b*' of the second connecting member 34*b* are substantially the same as the first portion 120*a*' and the second portion 120*a*' of the first connecting member. Similarly, the first expansion joint 200*b* and the second expansion joint 200*b*' of the second connecting member 34*b* are substantially the same as and operate in a similar manner as the first expansion joint 200*a* and the second expansion joint 200*a*' of the first connecting member 34*a*. The corner portion 160*b* has a different shape and size but still includes an arcuate surface 164*b*, a first flat surface 168*b*, and a second flat surface 172*b*.

The second connecting member 34*b* includes first and second mounting bores 300*b* in the arcuate outer surface 164*b* that are configured to receive fasteners that couple a support member 100 (shown in FIGS. 13-18, for example), which may support the screen 10 relative to a support surface, such as a desk or floor. The mounting bores 300*b* of the corner portion 160*b* of the second connecting member 34*b* are positioned adjacent to the second portion 120*b*' and therefore are each oriented along axes 302*b* that are oriented perpendicular to the second axis 128*b*'. The mounting bores 300*c* of the corner portion 160*c* of the third connecting member 34*c* are positioned adjacent to the first portion 120*c* and therefore are each oriented along axes 302*c* that are oriented perpendicular to the first axis 128*c*. Accordingly, the axes 302*b*, 302*c* of the each of the mounting bores 302*b*, 302*c* of the corner portions 160*b*, 160*c* of the respective second connecting member 34*b* and the third connecting member 34*c* are configured to be perpendicular to the longitudinal axis 48*c* of the third frame member 30*c*. These mounting bores 300*b* are configured to receive and couple to fasteners that couple support members 100 to the screen 10. The support members 100 may then couple to or otherwise support the screen 10 relative to the support surface, as discussed below. In the embodiment of FIG. 12, the corner portions 160*b* include a pair of mounting bores 300*b*, although any suitable number of mounting bores 300*b* may be included depending on the type of support member 100 intended to be coupled thereto.

With renewed reference to FIGS. 1-3, the third connecting member 34*c* is substantially the same as the second connecting member 34*b*, except where noted above, while the fourth connecting member 34*d* is substantially the same as the first connecting member 34*a*.

One or more of the plurality of connecting members 34*a*-34*d* are at least partially formed from a second material that is different than the first material. In the illustrated embodiment, the first portion 120*a*-120*d*, second portion 120*a*'-120*d*', and corner portion 160*a*-160*d* are a single unitary piece formed from the second material, which in this case is a plastic polymer. The plates of the expansion joints 200*a*-200*d*, 200*a*'-200*d*' are formed from a third material, which in this case is steel. The third material may be another suitable material.

The screen 10 is assembled as follows. The first frame member 30*a* and the second frame member 30*b* are coupled to one another by the first connecting member 34*a*. That is, the first portion 120*a* of the first connecting member 34*a* is positioned within the opening 60*a* of the first frame member 30*a* such that the fastener 208*a* of the first expansion joint 200*a* is aligned along the axis 68*a* of one of the apertures 64*a* in the first frame member 30*a* and the second fastener 212*a* of the first expansion joint 200*a* is aligned along the axis 68*a* of the other of the apertures 64*a* in the first frame member 30*a*. Also, positioning the first portion 120*a* within the first frame member 30*a* positions the corner portion 160*a* adjacent the second end 44*a* of the first frame member 30*a*. Accordingly, the first surface 168*a* of the corner portion 160*a* of the first connecting member 34*a* abuts against the second surface 92*a* of the second end 44*a* of the first frame member 30*a*. As shown, the surfaces 92*a*, 168*a* are flush with one another such that the arcuate surfaces of the first frame member 30*a* and the first connecting member 34*a* are continuous.

The first portion 120*a* of the first connecting member 34*a* is clamped to the first frame member 30*a*. That is, the first fastener 208*a* and the second fastener 212*a* of the first expansion joint 200*a* are accessible via the respective apertures 64*a* in the first frame member 30*a* and therefore can be actuated (e.g., rotated by a tool such as an Allen wrench) to move the plate 204*a* of the first expansion joint 200*a* from the retracted position to the extended position to clamp the first portion 120*a* against the first frame member 30*a*. Specifically, the first fastener 208*a* and the second fastener 212*a* are each actuated to move the plate 204*a* from the retracted position to the extended position to clamp the plate 204*a* against the first frame member 30*a*. In the embodiment in which a groove is included in the arcuate surface 164*a*, the grooves align with the groove 72*a*.

The second portion 120*a*' of the first connecting member 34*a* is positioned within the opening 60*b* of the second frame member 30*b* such that the first fastener 208*a*' of the second expansion joint 200*a*' is aligned along the axis 68*b* of one of the apertures 64*b* in the second frame member 30*b* and the second fastener 212*a*' of the second expansion joint 200' is aligned along the axis 68*b* of the other of the apertures 64*b* in the second frame member 30*b*. Also, positioning the second portion 120*a*' within the second frame member 30*b* positions the corner portion 160*a* adjacent the first end 40*b* of the second frame member 30*b*. Accordingly, the second surface 172*a* of the corner portion 160*a* of the first connecting member 34*a* abuts against the first surface 92*b* of the first end 40*b* of the second frame member 30*b*. As shown, the surfaces 92*b*, 172*a* are flush with one another such that the arcuate surfaces of the second frame member 30*b* and the first connecting member 34*a* are continuous. In the embodiment in which a groove is included in the arcuate surface 164*a*, the grooves align with the groove 72*b*. Accordingly, the aligned grooves may extend about all or a portion of the perimeter of the frame 14.

The second portion 120*a*' of the first connecting member 34*a* is clamped to the second frame member 30*b*. That is, the first fastener 208*a*' and the second fastener 212*a*' of the second expansion joint 200*a*' are accessible via the respective apertures 64*b* in the second frame member 30*b* and therefore can be actuated (e.g., rotated by a tool such as an Allen wrench) to move the plate 204*a*' of the second expansion joint from the retracted position to the extended position to clamp the second portion 120*a*' against the second frame member 30*b*. Specifically, the first fastener 208*a*' and the second fastener 208*b*' are each actuated to move the plate 204*a*' from the retracted position to the extended position to clamp the plate 204*a*' against the second frame member 30*b*.

In the same way that the first frame member 30*a* is coupled to the second frame member 30*b* by the first connecting member 34*a*, the second frame member 30*b* is coupled to the third frame member 30*c* by the second connecting member 34*b*, the third frame member 30*c* is coupled to the fourth frame member 30*d* by the third connecting member 34*c*, and the fourth frame member 30*d* is coupled to the first frame member 30*a* by the fourth connecting member 34*d*. The process is the same for each, so for the sake of brevity it is not repeated.

The panel 18, or infill, is coupled to the frame 14. More particularly, the panel 18 is supported by the frame 14 between the frame members 30*a*, 30*b*, 30*c*, 30*d*. In some embodiments, the frame 14 can be assembled around the panel 18. In some embodiments, the panel 18 can be positioned relative to the frame 14 after the frame 14 is assembled. Regardless, the panel 18 is positioned in the channels of the respective frame members 30*a*-30*d*. The frame 14 and the panel 18 are then enclosed by the cover 22. In some embodiments, a portion of the cover 22 (e.g., an interior seam of the cover 22 that extends at least partially along an interior perimeter of the cover 22) is received in one or more of the grooves 72*a*-72*d* of the frame members 30*a*-30*d*.

In some embodiments, the panel 18 may be made of a sound-absorbing material. For example, the panel 18 may be made of a PET material, felt material, or laminate material. In other embodiments, the panel 18 may be made of other materials. The cover 22 may be, for example, a fabric cover that encloses the frame 14 and the panel 18 to give a desired visual appearance (e.g., color, texture, etc.). In some embodiments, the cover 22 may be omitted.

As discussed above, the screens 10 are configured to be supported on a support surface, such as a desk or the floor. Accordingly, in some embodiments, such as that of FIGS. 1-3, 6, and 15, one or more support members 100 are coupled to one or more of the plurality of frame members 30*a*-30*d*, and in some embodiments, such as that of FIGS. 1-3 and 12-20, one or more support members 100 are coupled to one or more of the corner portions 160*a*-160*d* of the connecting members 34*a*-34*d*.

Figure 6:
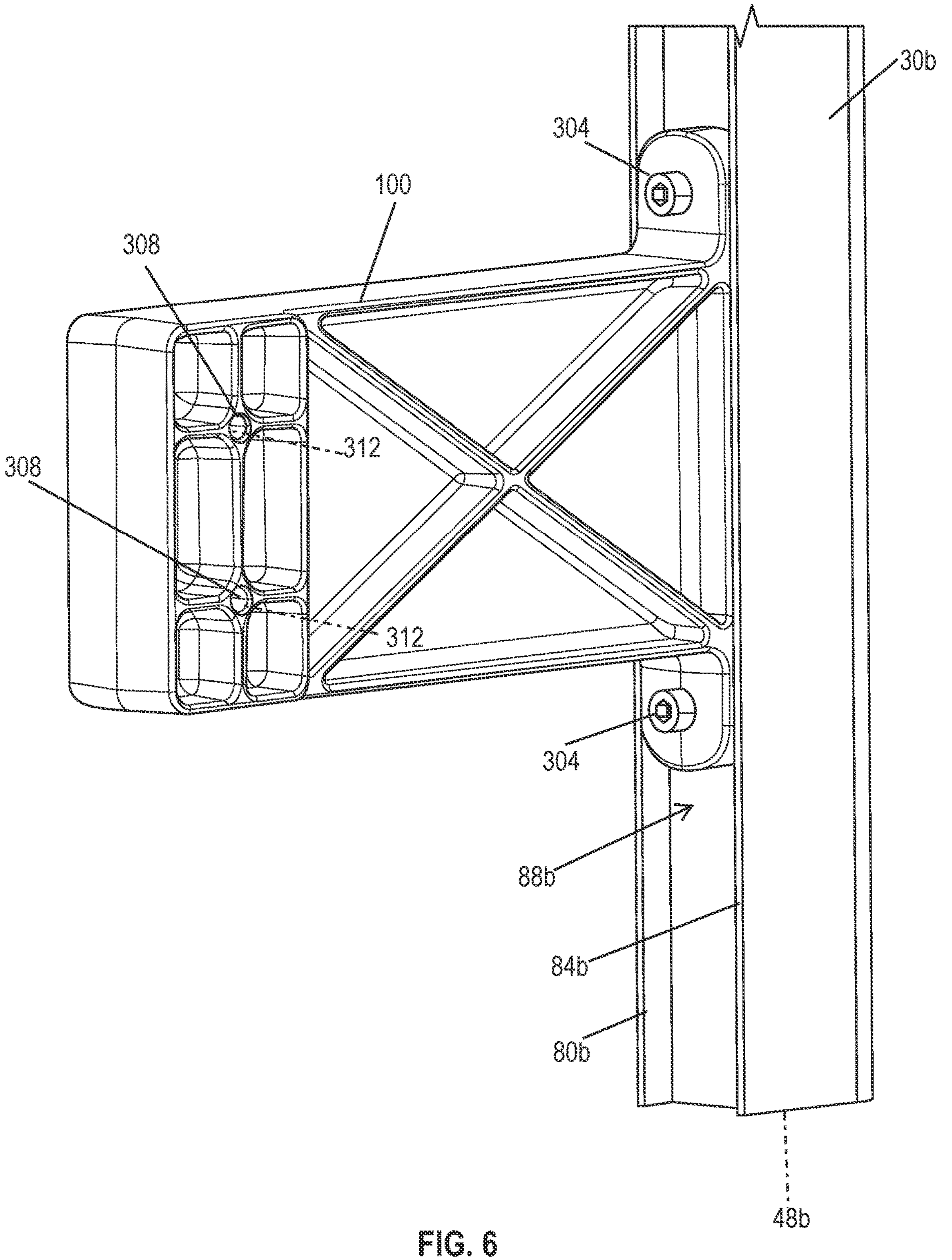
FIG. 6 is a detailed perspective view of a portion of a second frame member of FIG. 1.
Figure 7A:
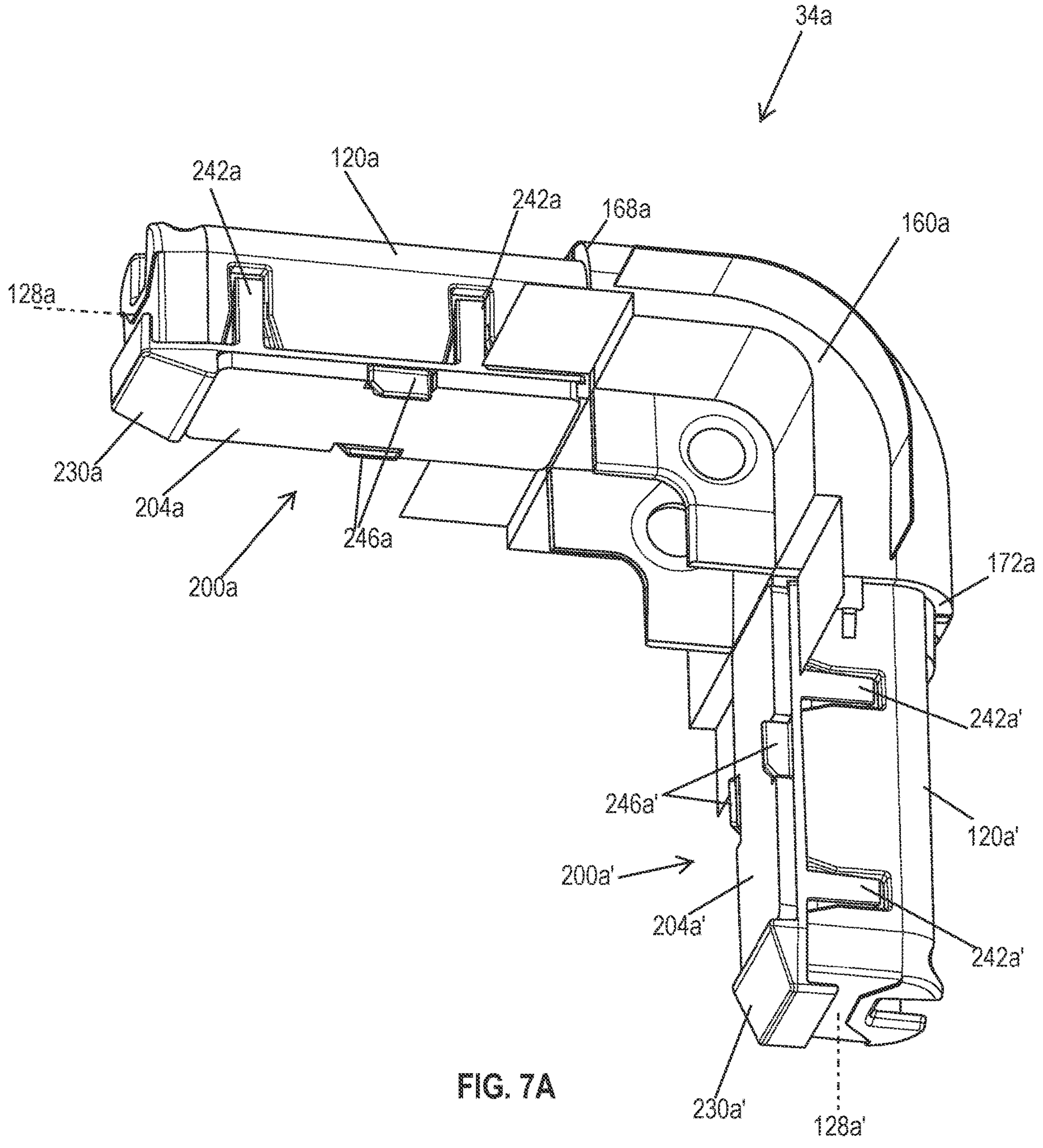
FIG. 7A is a perspective view of one of the connecting members of FIG. 1.
Figure 7B:
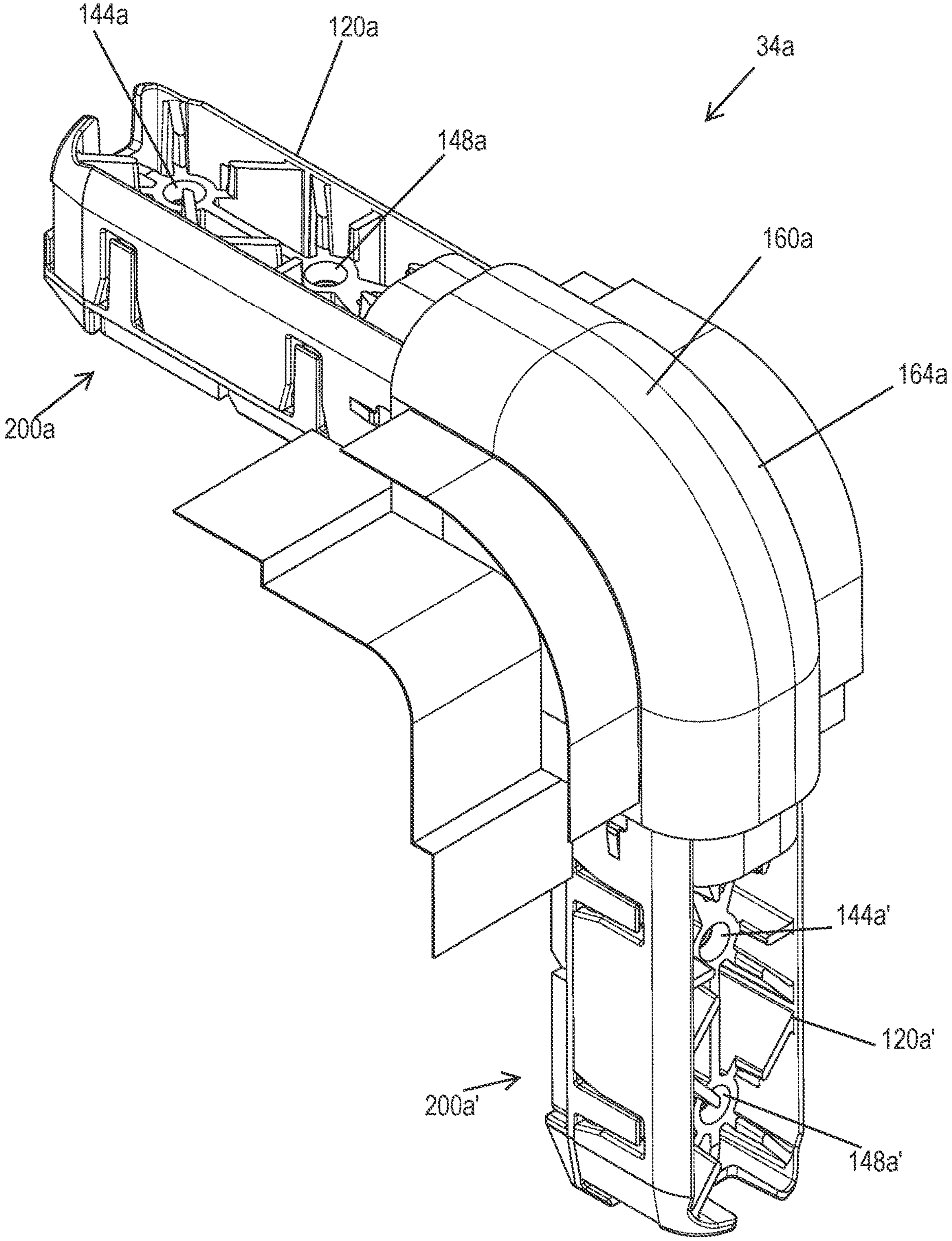
FIG. 7B is another perspective view of the connecting member of FIG. 1.

With respect to FIGS. 1-12 generally, the screen 10 is configured to be used as a privacy screen, a modesty screen, and/or a room divider. Accordingly, with specific reference to FIGS. 1, 2, and 6 one support member 100 is coupled to and extends from the second frame member 30*b* and one support member 100 is coupled to an extends from the fourth frame member 30*d*. As shown, the panel 18 has cut-outs that surround the support members 100. Although only one support member 100 is shown in detail in FIG. 6, both support members 100 include the same features. That is, the support member 100 includes a body that is coupled to the second side 56*b* of the second frame member 30*b* via fasteners 304 or the like. In the illustrated embodiment, the body is positioned within the channel 88*b* between the two flanges 80*b*, 84*b*. The body also defines one or more mounting apertures 308 extending therethrough that are configured to receive fasteners. The mounting apertures 308 of the support members 100 of FIG. 6 are each oriented along an axis 312 that is perpendicular to the longitudinal axis 48*b* of the second frame member 30*b* to which it is attached. The fasteners are configured to mount the support member 100, and therefore the screen 10, to the support surface, which in this case is a surface of a desktop. In other embodiments, such as that of FIGS. 15-18, a single support member 100 may extend between the second frame member 30*b* and the fourth frame member 30*d*.

The panel 18 has a first portion that is positioned above the support member and a second portion that is supported below the support member. In such a way, the screens of FIGS. 1-12 and 15-18 may act as a privacy screen and a modesty screen. In other words, because of the placement of the support members 100 relative to the frame 14 in FIGS. 1-3 and 15-18, a portion of the screen 10 (e.g., the portion generally above the support members 100) extends above a working surface of the desktop and acts as a privacy screen, and a portion of the screen (e.g., the portion generally below the support members 100) extends below the working surface of the desktop and acts as a modesty screen. The portion of the screen 10 of FIGS. 1-3 below the first working surface of the desktop only extends part of the distance between the desktop and the floor, whereas the portion of the screen 10 of FIGS. 15-18 below the working surface of the desktop may extend substantially the whole distance between the desktop and the floor.

Further with respect to FIGS. 1-3, 12, and 15-18, the corner portions 160*a*-160*d* of the connecting member 34*a*-34*d* may be configured to support the screen 10, as well. In the embodiment of FIGS. 1-3, the corner portions 160*b*, 160*c* of each of the second connecting member 34*b* and the third connecting member 34*c* include mounting bores 300*b*, which are discussed in greater detail above, and configured to receive and couple to support members 100.

Figure 17:
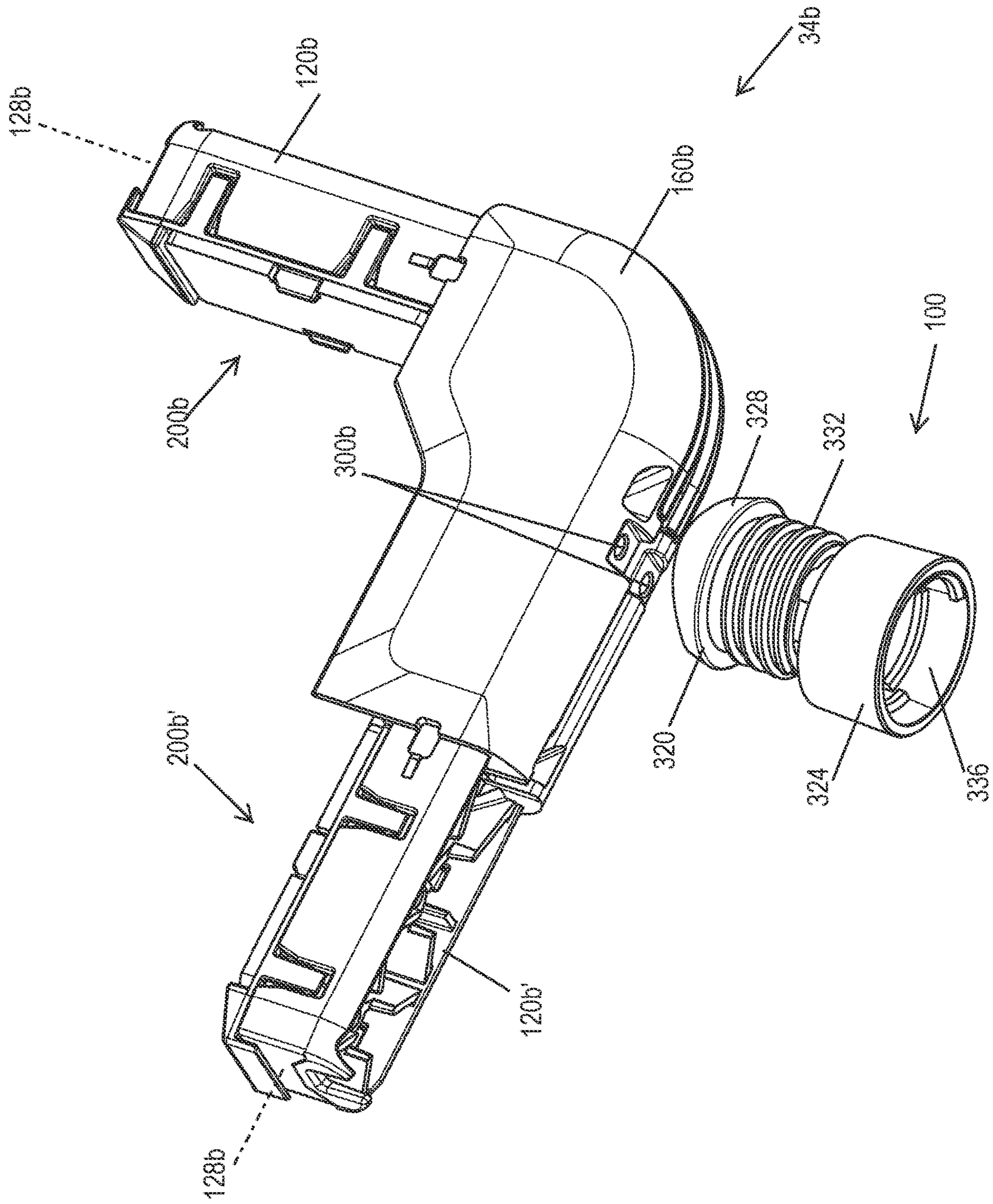
FIG. 17 is an exploded view of one of the connecting members of FIG. 15.
Figure 18:
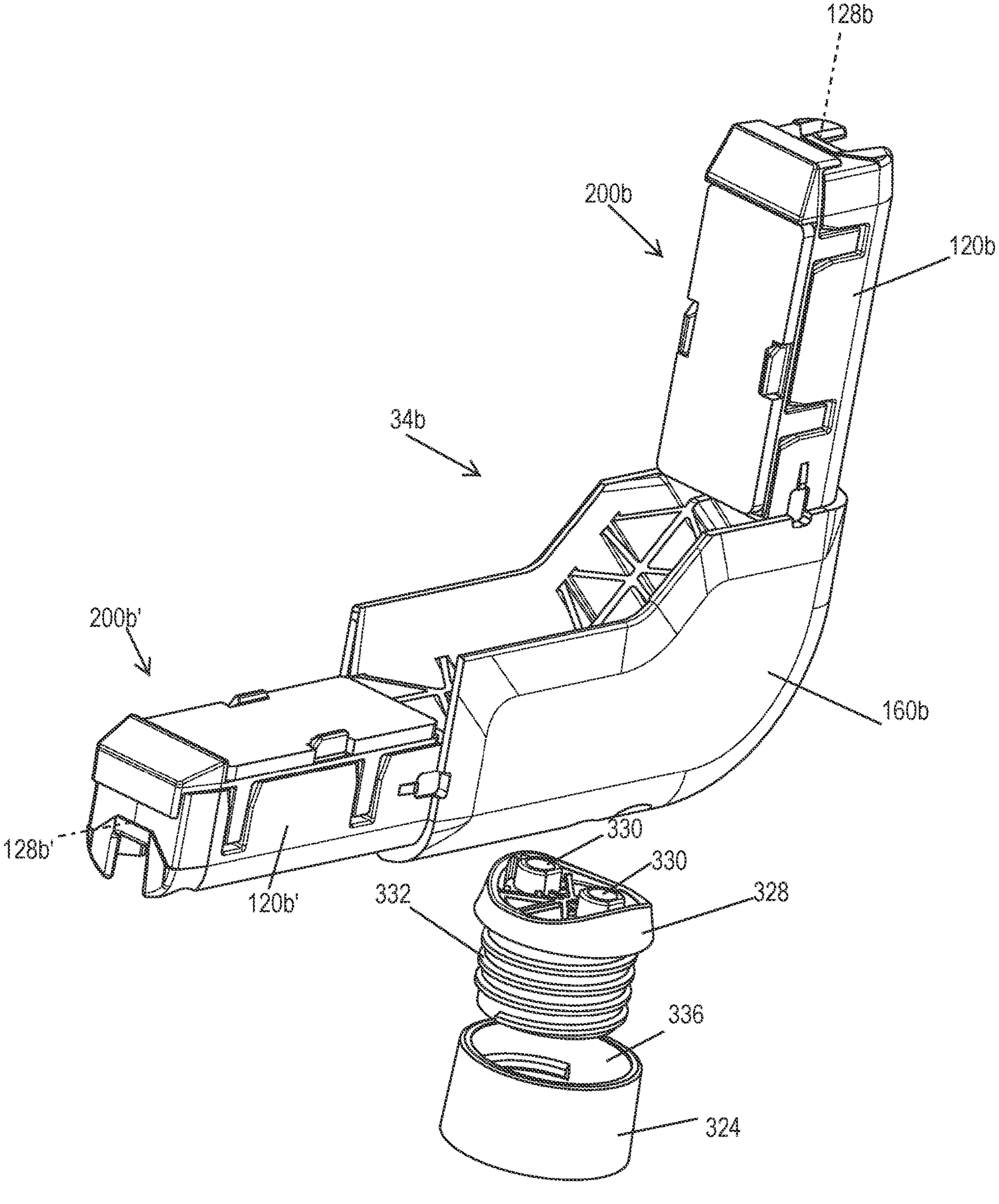
FIG. 18 is another exploded view of one of the connecting members of FIG. 15.

An exemplary support member 100 that may be coupled to the corner portions 160*b*, 160*c* of FIGS. 1-3, 12, and 15-18 is shown in FIGS. 15-18. The support members 100 shown in FIGS. 15-18 at least partially support the screen 10 on the floor. As shown in FIGS. 17-18, the support member 100 includes a first portion 320 and a second portion 324 that is threadably coupled to the first portion 320. The first portion 320 includes a coupling portion 328 and a threaded portion 332 extending from the coupling portion 328. The coupling portion 328 includes one or more apertures 330 that are configured to be aligned with the mounting bores 300*b* of the corner portion 160*b*. The fasteners extend through the apertures 330 and into the mounting bores 300*b* to couple the first portion 320 to the frame 14. The threaded portion 332 includes threads on an outer surface thereof. The second portion 324 includes a threaded portion 336 including mating threads on an inner surface thereof. The second portion 324 is coupled to the first portion 320 by threadably coupling the second portion 324 onto the first portion 320. The height of the screen 10 can be changed by rotating the second portion 324 relative to the first portion 320.

Figure 13:
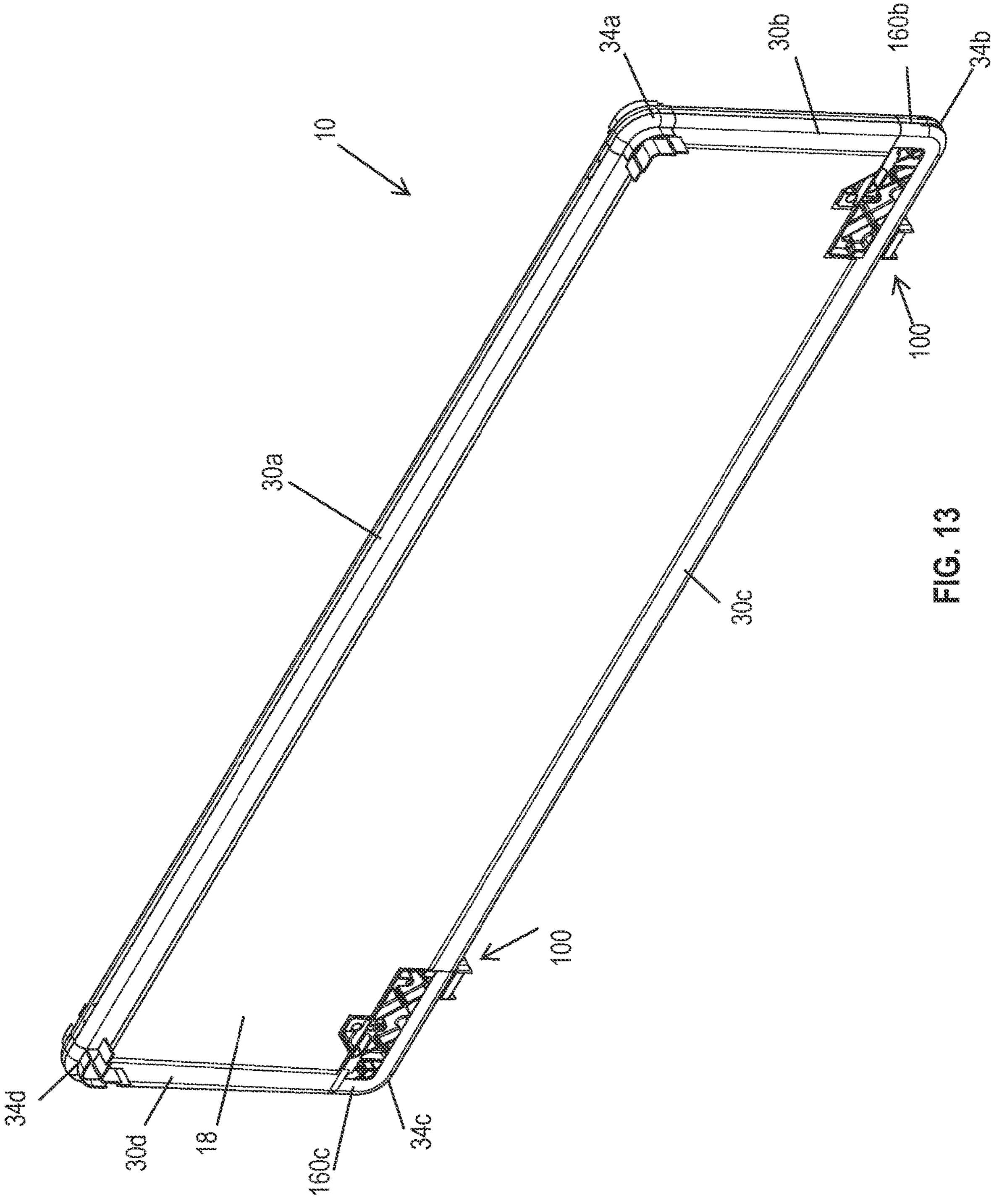
FIG. 13 is a perspective view of a screen according to another embodiment, the screen having a frame and a panel, the frame including frame members and connecting members.
Figure 14:
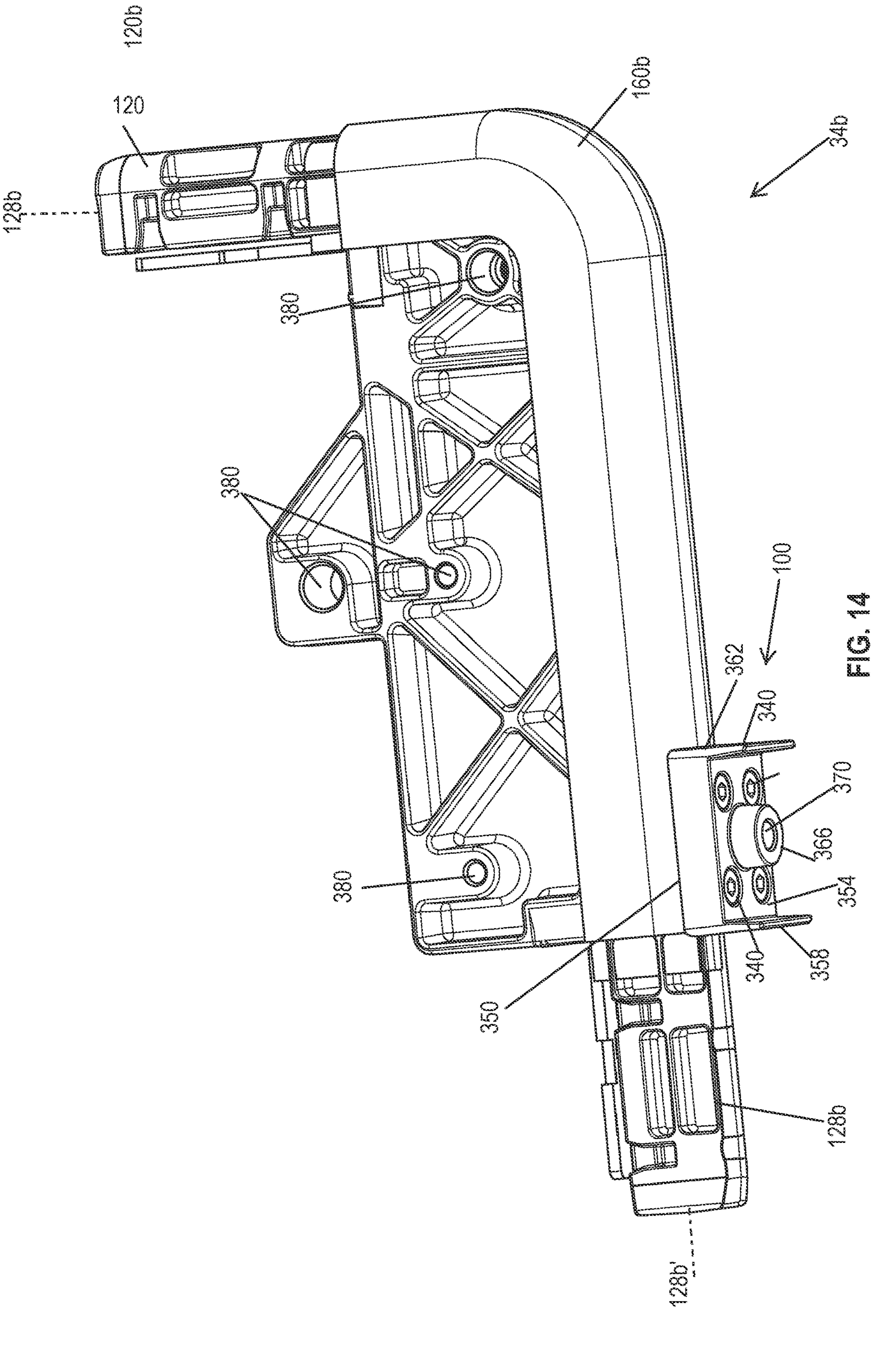
FIG. 14 is a perspective view of one of the connecting members of FIG. 13.
Figure 15:
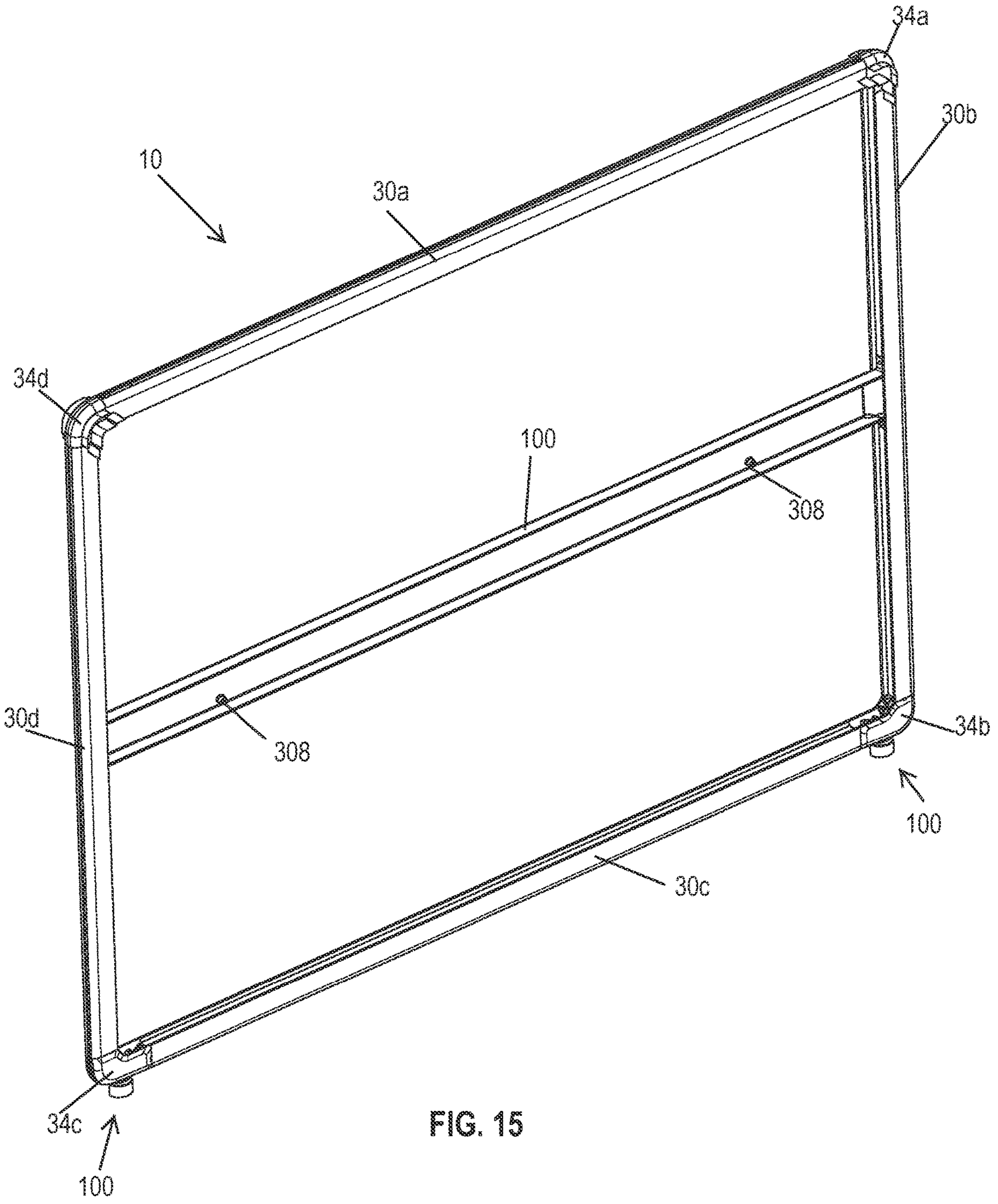
FIG. 15 is a perspective view of a screen according to another embodiment, the screen having a frame and a panel, which is removed, the frame including frame members and connecting members.
Figure 16:
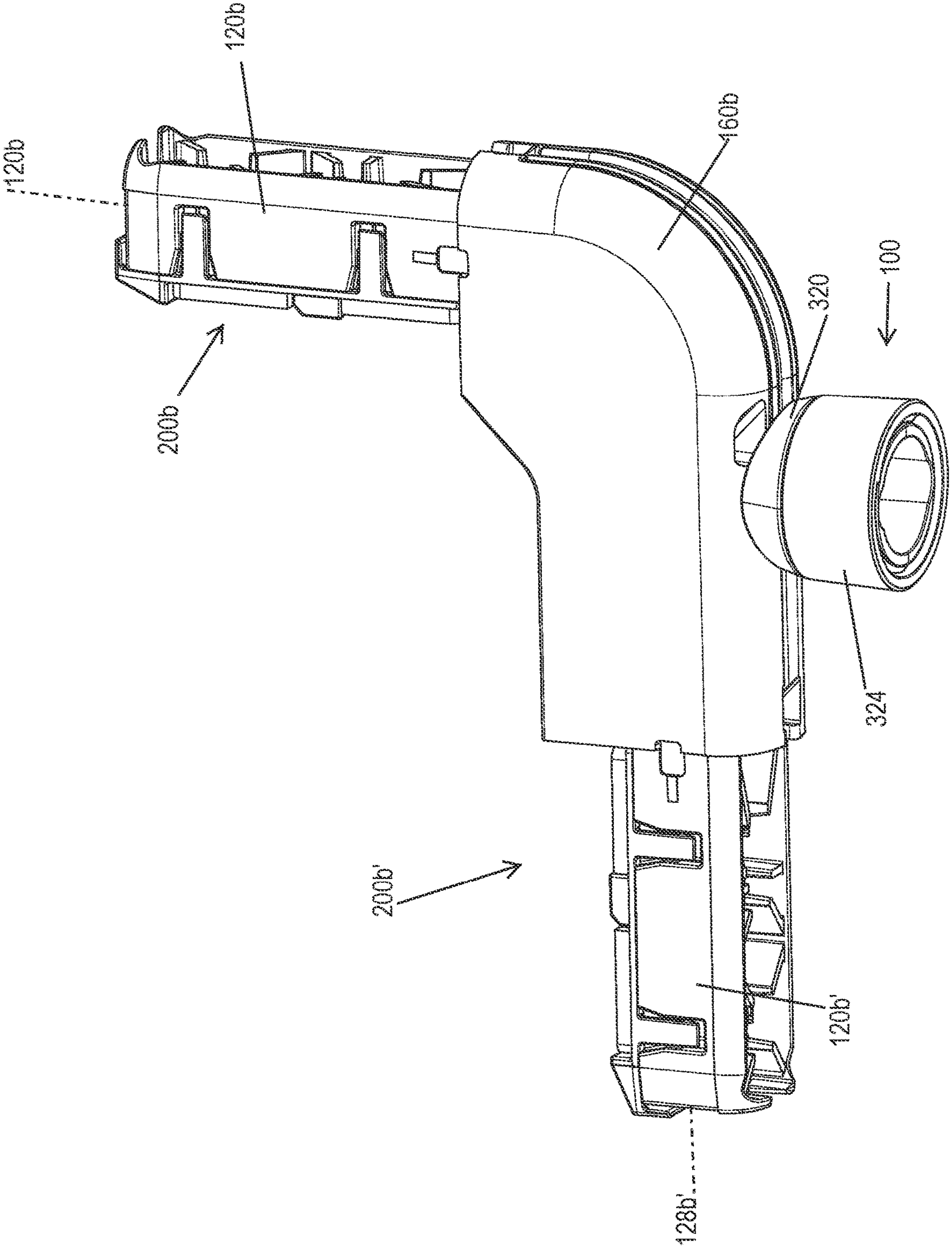
FIG. 16 is a perspective view of one of the connecting members of FIG. 15.

With respect to FIG. 13-14, the corner portions 160*b*, 160*c* may have other configurations, which may be configured to support the screen 10. In the embodiment of FIGS. 13-14, the corner portion 160*b* of each of the second connecting member 34*b* and the third connecting member 34*c* are configured to couple to and receive support members 100, which couple or otherwise support the screen 10 relative to a desk. That is, although not shown in FIGS. 13-14, the corner portion 160*b* include a plurality of mounting bores 300*b* (e.g., four mounting bores 300*b*) extending through the outer surface 164*b* thereof. Like the mounting bores 300*b* of the corner portion 160*b* of FIGS. 1-3 and 12, the mounting bores 300*b* of the corner portions 160*b* are each oriented similarly to those shown in FIGS. 15-18. These mounting bores 300*b* are configured to receive and couple to fasteners 340 that couple support member 100 to the screen 10.

In the embodiment of FIGS. 13-14, the support members 100 each include a body that has a first side 350 that is coupled to the respective corner portion 160*b* via the fasteners 340 received in the mounting bores 300*b* and a second side 354 opposite the first side 350. The body includes a first flange 358 extending from one end of the second side 354 of the body and a second flange 362 extending from an opposite end of the second side 354 of the body. The body further includes a projection 366 extending from the second side 354 of the body between the first flange 358 and the second flange 362. The projection 366 defines a bore 370 extending therethrough. The bore 370 is configured to receive a fastener on the support surface, which in this case is a desk. Accordingly, the screen 10 can act as a privacy screen that extends generally above a working surface of the desktop.

As shown in FIGS. 13-14, the corner portion 160 may also include additional mounting apertures 380. These mounting apertures 380 extend generally perpendicular to the mounting bores 300*b* and may be used to couple the screen 10 via fasteners and the like to a support surface, such as a desktop, in other ways. As shown, panel 18 has cut-outs that surround the sides of the corner portions 160*b*, 160*c*.

Figure 19:
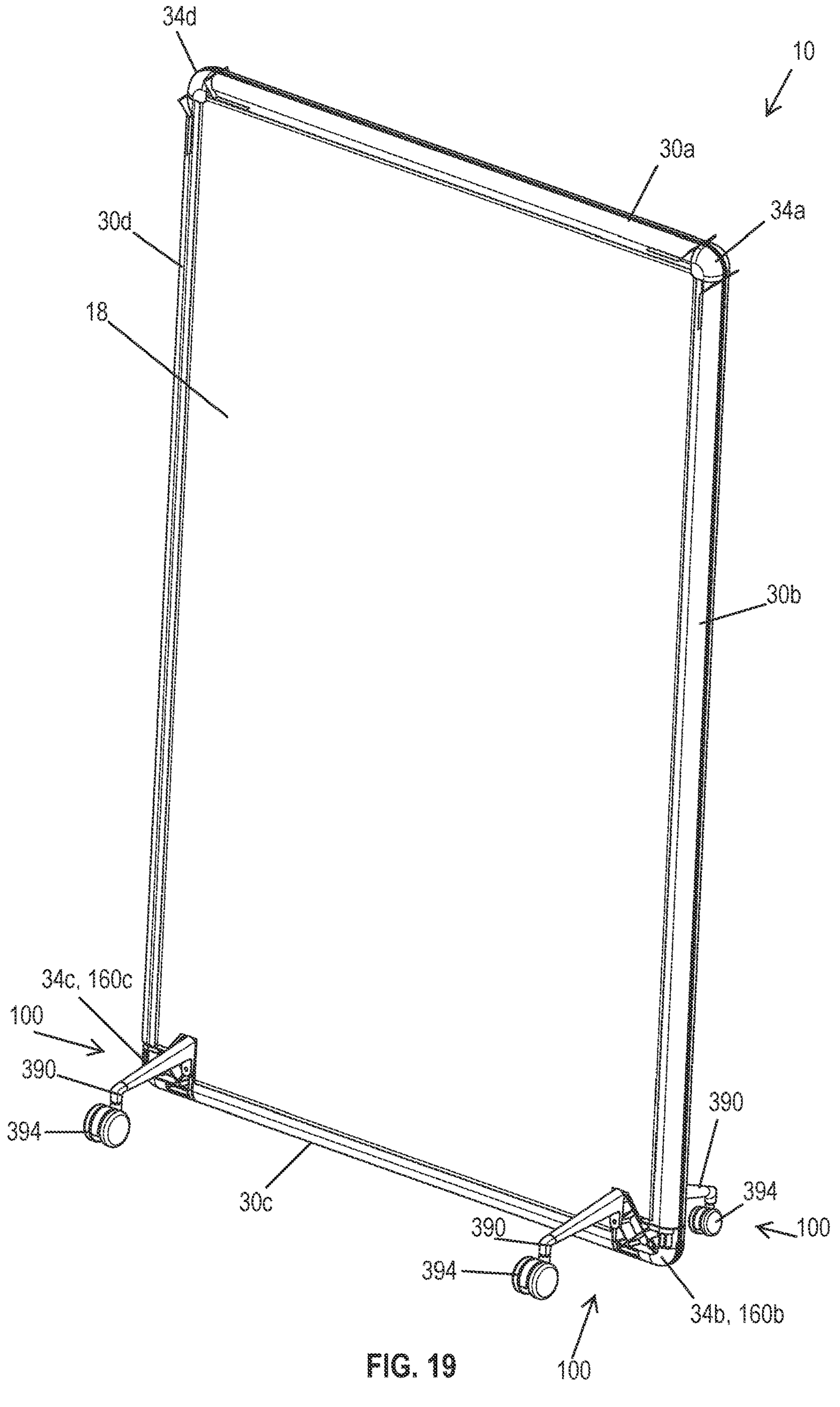
FIG. 19 is a perspective view of a screen according to another embodiment, the screen having a frame and a panel, the frame including frame members and connecting members.
Figure 20:
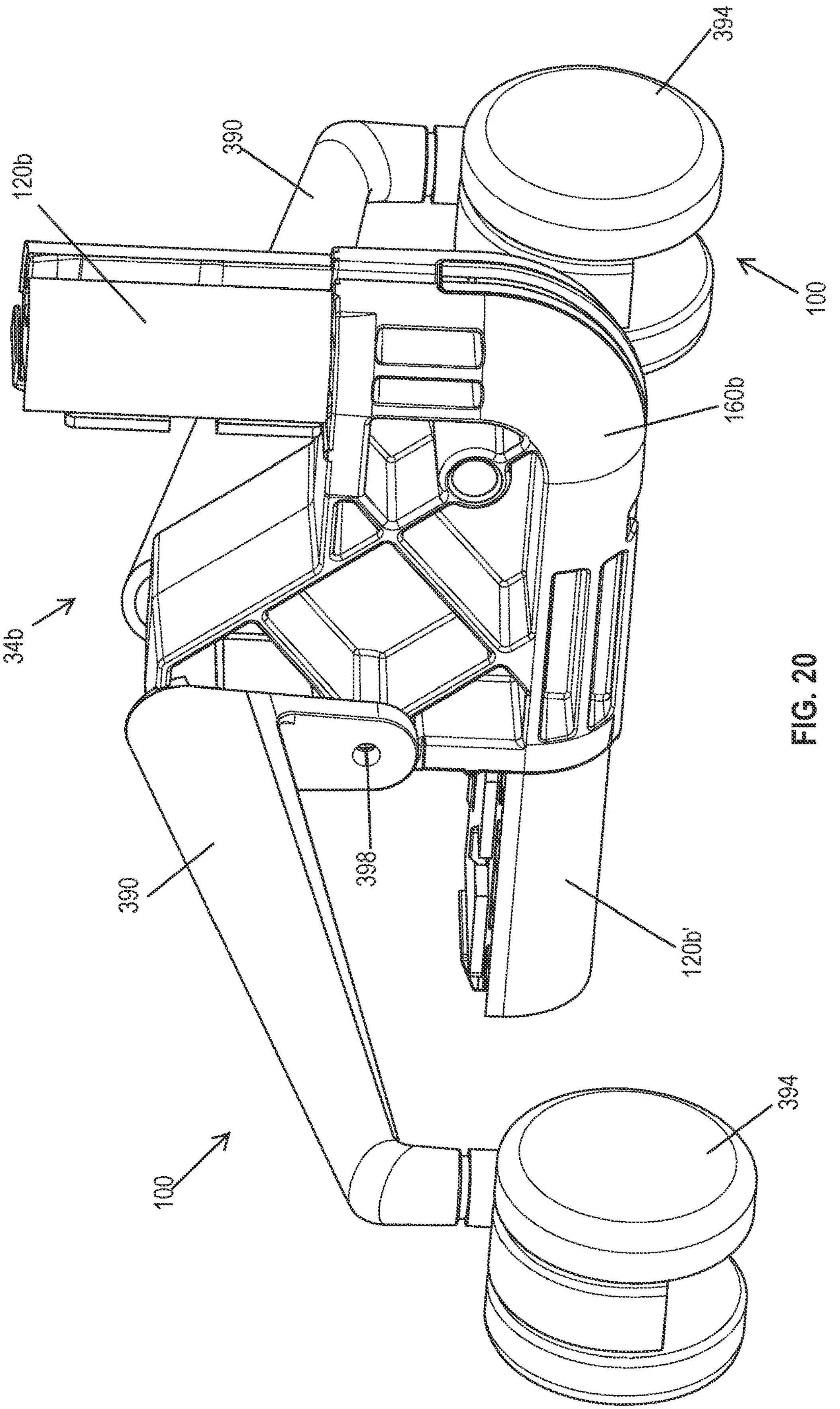
FIG. 20 is a perspective view of one of the connecting members of FIG. 19.

As shown in FIGS. 19-20, the screen 10 may be entirely supported on and movable relative to a support surface, which in this case is the floor. As shown, the corner portions 160*b*, 160*c* of FIGS. 19-20 of each of the second connecting member 34*b* and the third connecting member 34*c* are configured to couple to support members 100, which support the screen 10 relative to the floor. In the illustrated embodiment, the support member 100 each have a leg 390 and a caster wheel 394 coupled to the leg 390. As shown, additional mounting apertures 398 of the corner portions may be used to couple (via fasteners or the like) to two legs 390, one on each side of the screen 10, such that the screen 10 is supported by and movable relative the floor via the castor wheels 394.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A screen comprising:

a frame defining a perimeter, the frame including a first frame member having a first longitudinal axis, a first opening extending therethrough along the first longitudinal axis, and an aperture extending along an axis that intersects the first longitudinal axis, a second frame member having a second longitudinal axis and a second opening extending therethrough along the second longitudinal axis, and a connecting member coupled between the first frame member and the second frame member, the connecting member forming a portion of the perimeter of the frame, the connecting member including a first portion that is received within the first opening and having a plate movable relative to the first portion via a fastener to clamp the plate against the first frame member, the first fastener being accessible through the aperture, and a second portion that is received in the second opening; and a panel coupled the frame.

2. The screen of claim 1, wherein the aperture is a first aperture, the plate is a first plate, the axis is a first axis, and the fastener is a first fastener, wherein the second frame member includes a second aperture extending along a second axis that intersects the second longitudinal axis, and wherein the second portion of the connecting member has a second plate that is movable relative to the second portion via a second fastener to clamp the second plate against the second frame member, the second fastener being accessible through the second aperture.

3. The screen of claim 1, wherein the connecting member includes a corner portion that is coupled to the first portion and the second portion, the corner portion positioned between the first frame member and the second frame member and forming the portion of the perimeter.

4. The screen of claim 3, wherein the corner portion includes a first surface that is flush with a surface of the first frame member and a second surface that is flush with the second frame member.

5. The screen of claim 1, wherein the connecting member is couplable to a support member that is configured to support the screen relative to a support surface.

6. The screen of claim 1, wherein the first frame member and the second frame member are formed from a first material, and wherein the connecting member is at least partially formed from a second material that is different from the first material.

7. The screen of claim 6, wherein the first material is aluminum and the second material is a plastic polymer.

8. The screen of claim 1, further comprising a cover that encloses the frame and the panel.

9. A screen comprising:

a frame including a plurality of frame members, each of the plurality of frame members including a longitudinal axis, an opening extending therethrough along the longitudinal axis, and an aperture extending along an axis that intersects the longitudinal axis, and a plurality of connecting members, each of the plurality of connecting members including a first portion that is received within the opening of one frame member of the plurality of frame members, the first portion including a first expansion joint that has a first plate and a first fastener accessible through the aperture in the one frame member such that the first fastener is actuatable to move the first plate relative to the first portion to clamp the first plate against the one frame member, and a second portion that is received within the opening of an adjacent frame member of the plurality of frame members, the second portion including a second expansion joint that has a second plate and a second fastener accessible through the aperture of the adjacent frame member such that the second fastener is actuatable to move the second plate relative to the second portion to clamp the second plate against the adjacent frame member; and a panel coupled to the frame.

10. The screen of claim 9, further comprising a cover that encloses the frame and the panel.

11. The screen of claim 9, wherein each of the plurality of connecting members includes a corner portion that is coupled to the first portion and the second portion and positioned between the one frame member and the adjacent frame member.

12. The screen of claim 11, wherein each of the corner portions includes a first surface that is flush with the one frame member and a second surface that is flush with the adjacent frame member.

13. The screen of claim 9, wherein each of the plurality of frame members includes a groove extending parallel to the longitudinal axis, and wherein the aperture of each of the plurality of frame members extends through a surface of the groove.

14. The screen of claim 9, wherein each of the plurality of frame members is formed from a first material, and wherein at least one of the connecting members is at least partially formed from a second material that is different from the first material.

15. The screen of claim 14, wherein the first material is aluminum and the second material is a plastic polymer.

16. A method of assembling a screen, the method comprising:

assembling a frame including positioning a first portion of a connecting member within a first opening of a first frame member having a first longitudinal axis, the first portion including a first plate and a first fastener, and positioning a second portion of the connecting member within a second opening of a second frame member having a second longitudinal axis, the second portion including a second plate and a second fastener, and clamping the first plate of the connecting member to the first member by actuating the first fastener at a perpendicular angle relative to the first longitudinal axis to move the first plate relative to the first portion, the first fastener being accessible from outside of the first frame member, and clamping the second plate of the connecting member to the second member by actuating the second fastener at a perpendicular angle relative to the first longitudinal axis to move the second plate relative to the second portion, the second fastener being accessible from outside of the second frame member, and coupling a panel to the frame.

17. The method of claim 16, further comprising enclosing the frame and the panel material with a cover.

18. The method of claim 16, further comprising coupling a third frame member to the second frame member and coupling a fourth frame member to the third frame member and the first frame member.

19. The method of claim 16, further comprising positioning a corner portion of the connecting member between the first frame member and the second frame member.

20. The method of claim 16, further comprising coupling a support member to the frame, the support member configured to support the frame relative to a support surface.

* * * * *